(12) United States Patent
Ishibashi et al.

(10) Patent No.: US 11,230,878 B2
(45) Date of Patent: Jan. 25, 2022

(54) GLASS PANEL UNIT ASSEMBLY AND METHOD FOR MANUFACTURING GLASS PANEL UNIT

(71) Applicant: PANASONIC INTELLECTUAL PROPERTY MANAGEMENT CO., LTD., Osaka (JP)

(72) Inventors: Tasuku Ishibashi, Ishikawa (JP); Eiichi Uriu, Osaka (JP); Kazuya Hasegawa, Osaka (JP); Hiroyuki Abe, Osaka (JP); Masataka Nonaka, Osaka (JP); Takeshi Shimizu, Osaka (JP); Haruhiko Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/044,642

(22) PCT Filed: Mar. 8, 2019

(86) PCT No.: PCT/JP2019/009227
§ 371 (c)(1),
(2) Date: Oct. 1, 2020

(87) PCT Pub. No.: WO2019/207970
PCT Pub. Date: Oct. 31, 2019

(65) Prior Publication Data
US 2021/0108458 A1 Apr. 15, 2021

(30) Foreign Application Priority Data
Apr. 26, 2018 (JP) .............................. JP2018-085836

(51) Int. Cl.
*E06B 3/677* (2006.01)
*C03C 27/06* (2006.01)
(Continued)

(52) U.S. Cl.
CPC ............ *E06B 3/6775* (2013.01); *C03C 27/06* (2013.01); *E06B 3/6612* (2013.01);
(Continued)

(58) Field of Classification Search
CPC .. E06B 3/6775; E06B 3/6733; E06B 3/66304; E06B 3/6612; E06B 3/66309;
(Continued)

(56) References Cited

U.S. PATENT DOCUMENTS

2015/0068665 A1   3/2015  Abe et al.
2015/0068666 A1*  3/2015  Abe ...................... E06B 3/6775
                                                              156/109

(Continued)

FOREIGN PATENT DOCUMENTS

JP   H11-262717 A    9/1999
JP   2016-108799 A   6/2016
(Continued)

OTHER PUBLICATIONS

International Search Report and Written Opinion issued in International Patent Application No. PCT/JP2019/009227, dated May 14, 2019; with partial English translation.

*Primary Examiner* — Donald J Loney
(74) *Attorney, Agent, or Firm* — McDermott Will and Emery LLP

(57) ABSTRACT

A glass panel unit assembly includes: a pair of glass substrates arranged to face each other; a peripheral wall; a partition; an air passage; and an evacuation port. The peripheral wall has a frame shape and is disposed between the pair of glass substrates. The partition partitions an internal space, surrounded with the pair of glass substrates and the peripheral wall, into a first space and a second space. The air passage connects the first space and the second space together. The evacuation port connects the second space to (Continued)

an external environment. The partition is lower in height than the peripheral wall.

4 Claims, 19 Drawing Sheets

(51) Int. Cl.
  *E06B 3/66* (2006.01)
  *E06B 3/663* (2006.01)
  *E06B 3/673* (2006.01)
(52) U.S. Cl.
  CPC ...... *E06B 3/66304* (2013.01); *E06B 3/66309* (2013.01); *E06B 3/6733* (2013.01)
(58) Field of Classification Search
  CPC ......... E06B 3/677; E06B 3/663; Y02B 80/22; Y02A 30/249
  See application file for complete search history.

(56) References Cited

U.S. PATENT DOCUMENTS

2018/0038152 A1  2/2018  Nonaka et al.
2018/0179806 A1  6/2018  Abe et al.

FOREIGN PATENT DOCUMENTS

WO  2013/172034 A1  11/2013
WO  2016/143328 A1  9/2016

* cited by examiner

GLASS PANEL UNIT ASSEMBLY AND METHOD FOR MANUFACTURING GLASS PANEL UNIT

CROSS-REFERENCE OF RELATED APPLICATIONS

This application is the U.S. National Phase under 35 U.S.C. § 371 of International Patent Application No. PCT/JP2019/009227, filed on Mar. 8, 2019, which in turn claims the benefit of Japanese Application No. 2018-085836, filed on Apr. 26, 2018, the entire disclosures of which Applications are incorporated by reference herein.

TECHNICAL FIELD

The present disclosure generally relates to a glass panel unit assembly and a method for manufacturing a glass panel unit. More particularly, the present disclosure relates to an assembly of thermally insulating glass panel units each having a space between a pair of glass panels, and a method for manufacturing the glass panel unit.

BACKGROUND ART

Patent Literature 1 discloses a method for manufacturing a glass panel unit in which a vacuum space is created between a pair of glass panels. According to this manufacturing method, a first glass substrate and a second glass substrate (a pair of glass substrates) are arranged to face each other with a frame member (peripheral wall) interposed between them. Thereafter, the frame member is heated and melted, thereby hermetically bonding the first glass substrate and the second substrate together. At this time, the internal space surrounded with the first and second glass substrates and the frame member is partitioned by a partition into a first space and a second space. The first space is evacuated through the second space to turn into a vacuum space. Thereafter, the vacuum space is sealed hermetically to obtain an assembly. A glass panel unit is obtained by cutting out a part of this assembly.

In the glass panel unit of Patent Literature 1, the first glass substrate and the second glass substrate are bonded together with the frame member. In this case, if at least one of the first and second glass substrates has warpage, then the gap distance between the first and second glass substrates may be different in a central region thereof from in a peripheral region thereof. Particularly when the gap distance between the first and second glass substrates is narrower in the central region thereof than in the peripheral region thereof, the presence of the partition could prevent the frame member (peripheral wall) from making contact with the respective peripheral portions of the first and second glass substrates. This could cause insufficient bonding between the first and second glass substrates.

CITATION LIST

Patent Literature

Patent Literature 1: JP 2016-108799 A

SUMMARY OF INVENTION

The problem to overcome is to provide a glass panel unit assembly and a method for manufacturing a glass panel unit, both of which contribute to increasing the production yield.

A glass panel unit assembly according to an aspect of the present disclosure includes: a pair of glass substrates arranged to face each other; a peripheral wall having a frame shape and disposed between the pair of glass substrates; a partition; an air passage; and an evacuation port. The partition partitions an internal space, surrounded with the pair of glass substrates and the peripheral wall, into a first space and a second space. The air passage connects the first space and the second space together. The evacuation port connects the second space to an external environment. The partition is lower in height than the peripheral wall.

A method for manufacturing a glass panel unit according to another aspect of the present disclosure includes an assembling step, an evacuation step, and a sealing step. The assembling step includes providing the glass panel unit assembly described above. The evacuation step includes evacuating the first space through the air passage, the second space, and the evacuation port. The sealing step includes deforming the partition to close the air passage.

DESCRIPTION OF EMBODIMENTS

1. Embodiments

1.1. Overview

Figure 1:
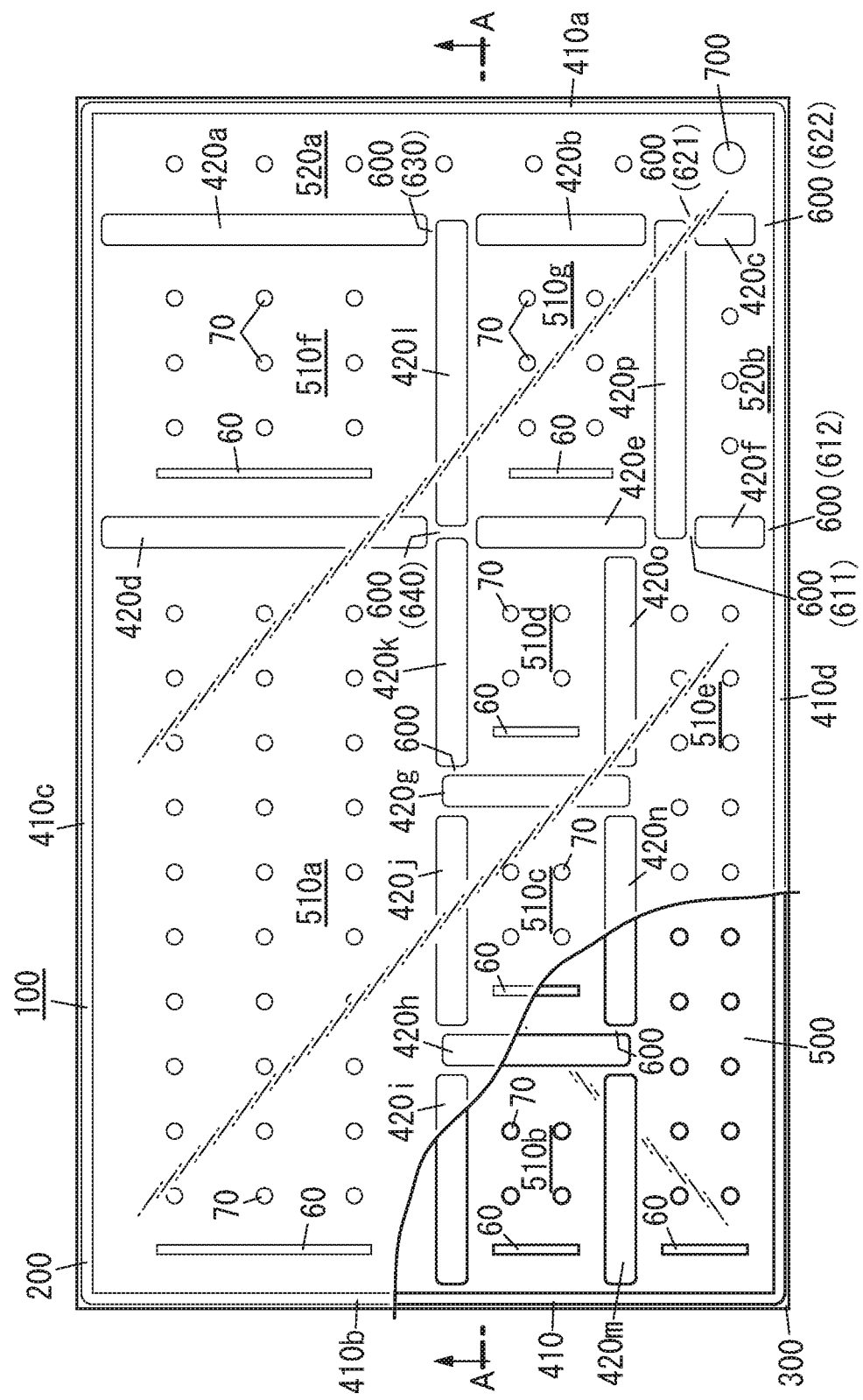
FIG. 1 is a plan view of a glass panel unit assembly according to an exemplary embodiment.
Figure 2:
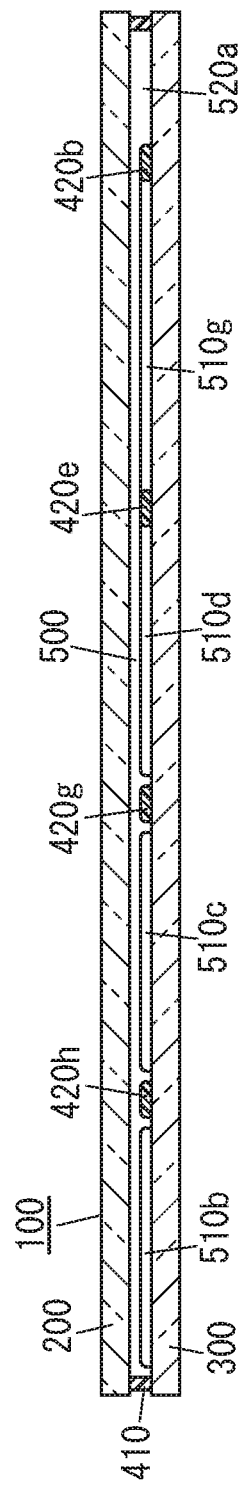
FIG. 2 is a cross-sectional view thereof taken along the plane A-A shown in FIG. 1.

FIGS. 1 and 2 illustrate a glass panel unit assembly (hereinafter simply referred to as an "assembly") 100 according to an exemplary embodiment. The assembly 100 is used to manufacture one or more glass panel units (e.g., the glass panel units 10A-10G shown in FIG. 15 in this embodiment). An assembly 100 includes: a pair of glass substrates 200, 300 arranged to face each other; a peripheral wall 410; partitions 420a-420p; an air passage 600; and an evacuation port 700. The peripheral wall 410 has a frame shape and is disposed between the pair of glass substrates 200, 300. The partitions 420a-420p partition an internal space 500, surrounded with the pair of glass substrates 200, 300 and the peripheral wall 410, into first spaces 510a-510g and second spaces 520a, 520b. The air passage 600 (directly or indirectly) connects the first spaces 510a-510g and the second spaces 520a, 520b together. The evacuation port 700 connects the second spaces 520a. 520b to an external environment. The partitions 420a-420p are lower in height than the peripheral wall 410 as shown in FIGS. 1 and 2.

In this assembly 100, the partitions 420a-420p are located within an area surrounded with the peripheral wall 410 and are lower in height than the peripheral wall 410. Thus, even if the gap between the pair of glass substrates 200, 300 is narrower in the central region than in the peripheral region thereof due to the warpage of at least one of the glass substrates 200, 300, the partitions 420a-420p are less likely to come into contact with both of the pair of glass substrates 200, 300. This reduces the chances of the contact of the peripheral wall 410 with both of the pair of glass substrates 200, 300 being interfered with by the partitions 420a-420p, thus reducing the chances of causing insufficient bonding between the pair of glass substrates 200, 300. This contributes to increasing the production yield.

1.2. Configuration

Figure 15:
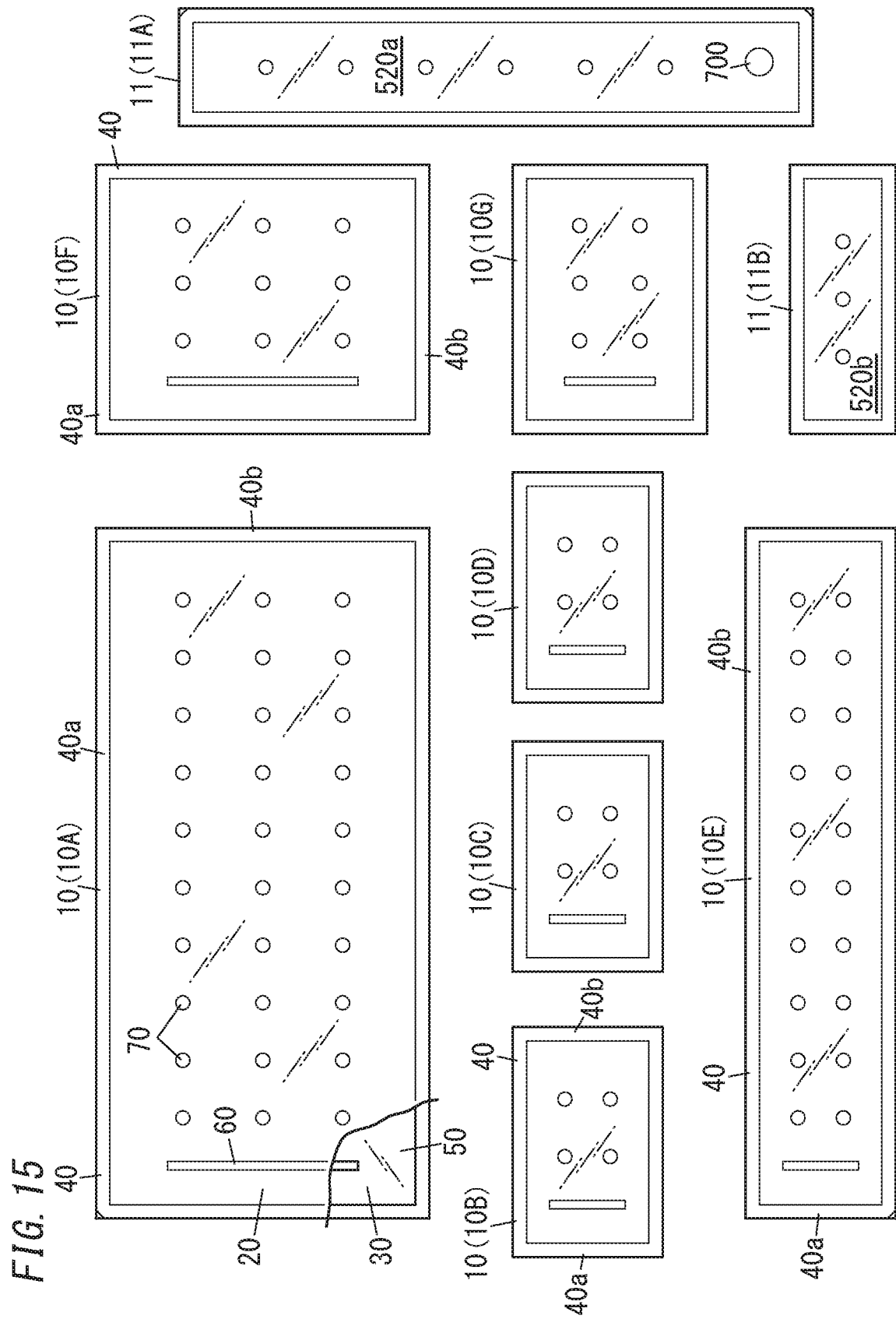
FIG. 15 illustrates how to perform a removing step in the manufacturing method.

Next, a glass panel unit assembly 100 according to this embodiment will be described in detail. The assembly 100 is used to manufacture a plurality of (e.g., seven in this example) glass panel units 10 (10A-10G) as shown in FIG. 15.

The glass panel units 10 (10A-10G) are vacuum insulated glazing units. The vacuum insulated glazing unit is a type of multi-pane glazing unit (or multi-pane glass panel unit) including at least one pair of glass panels and has a vacuum space between the pair of glass panels. Each of the glass panel units 10A-10G includes a pair of glass panels (first and second glass panels) 20, 30, and a frame member 40 as shown in FIG. 15. In addition, each of the glass panel units 10A-10G further includes a space (vacuum space) 50 (50a-50g (see FIG. 3)) surrounded with the pair of glass panels 20, 30 and the frame member 40. Each of the glass panel units 10A-10G further includes, within the vacuum space 50, a gas adsorbent 60 and a plurality of pillars (spacers) 70. As can be seen from FIG. 15, the glass panel units 10A-10G each have a quadrangular shape in a plan view, but not all the glass panel units 10A-10G have the same dimensions or the same shape.

The pair of glass panels 20, 30 have the same shape, and may be each formed in a rectangular flat plate shape. Examples of materials for the pair of glass panels 20, 30 include soda lime glass, high strain point glass, chemically tempered glass, alkali-free glass, quartz glass, Neoceram, and thermally tempered glass. The surface of the pair of glass panels 20, 30 may be covered with a coating. The coating may be a transparent infrared reflective film, for example. However, this is only an example and should not be construed as limiting. The coating does not have to be an infrared reflective film but may also be any other film with desired physical properties.

The frame member 40 is arranged between the pair of glass panels 20, 30 to hermetically bond the pair of glass panels 20, 30 together. This allows a space, surrounded with the pair of glass panels 20, 30 and the frame member 40, to be created. In addition, the space surrounded with the pair of glass panels 20, 30 and the frame member 40 is a vacuum space 50. The frame member 40 may be made of a hot glue as a sealant. In other words, the frame member 40 is a cured hot glue. The hot glue may be a glass frit, for example. The glass frit may be a low-melting glass frit, for example. Examples of the low-melting glass frits include a bismuth-based glass frit, a lead-based glass frit, and a vanadium-based glass frit. The frame member 40, as well as the pair of glass panels 20, 30, has a polygonal shape (e.g., a quadrangular shape in this embodiment). The frame member 40 is formed along the respective outer peripheries of the pair of glass panels 20, 30. The hot glue does not have to be a glass frit but may also be a low-melting metal or a hot-melt adhesive, for example.

The gas adsorbent 60 is arranged in the vacuum space 50. Specifically, the gas adsorbent 60 has an elongate flat-plate shape and is arranged on the glass panel 30. The gas adsorbent 60 is used to adsorb an unnecessary gas (such as a residual gas). The unnecessary gas is a gas emitted from the hot glue forming the frame member 40 when the hot glue is heated, for example. The gas adsorbent 60 includes a getter. The getter is a material having the property of adsorbing molecules smaller in size than a predetermined one. The getter may be an evaporative getter, for example. The evaporative getter has the property of releasing adsorbed molecules when heated to a predetermined temperature (activation temperature) or more. This allows, even if the adsorption ability of the evaporative getter deteriorates, the evaporative getter to recover its adsorption ability by being heated to the activation temperature or more. The evaporative getter may be a zeolite or an ion-exchanged zeolite (such as a copper ion exchanged zeolite). The gas adsorbent 60 includes a powder of this getter. Specifically, the gas adsorbent 60 may be formed by applying a liquid including a powder of the getter (such as a dispersion liquid obtained by dispersing a powder of the getter in a liquid or a solution obtained by dissolving a powder of the getter in a liquid) and solidifying the liquid. This reduces the size of the gas adsorbent 60, thus allowing the gas adsorbent 60 to be arranged even when the vacuum space 50 is narrow.

The plurality of pillars 70 are placed in the vacuum space 50. The plurality of pillars 70 is used to maintain a predetermined gap between the pair of glass panels 20, 30. That is to say, the plurality of pillars 70 is used to maintain the gap distance between the pair of glass panels 20, 30 at a desired value. Note that the dimensions, number, spacing, and arrangement pattern of the pillars 70 may be selected appropriately. Each of the pillars 70 has the shape of a circular column, of which the height is approximately equal to the predetermined gap. For example, the pillars 70 may have a diameter of 1 mm and a height of 100 µm. Optionally, the pillars 70 may also have any other desired shape such as a prismatic or spherical shape.

As shown in FIGS. 1 and 2, the assembly 100 includes: a pair of glass substrates (first and second glass substrates) 200, 300 arranged to face each other; a peripheral wall 410;

partitions 420*a*-420*p*; a plurality of air passages 600; and an evacuation port 700. The assembly 100 further includes a plurality of gas adsorbents 60 and a plurality of pillars (spacers) 70.

The first glass substrate 200 is a member that forms the basis of the first glass panel 20 and is made of the same material as the first glass panel 20. The second glass substrate 300 is a member that forms the basis of the second glass panel 30 and is made of the same material as the second glass panel 30. The first and second glass substrates 200, 300 have the same shape and each have a polygonal plate shape (e.g., a rectangular plate shape in this embodiment). In this embodiment, the first glass substrate 200 has dimensions that are large enough to form the respective first glass panels 20 of the glass panel units 10A-10G, and the second glass substrate 300 has dimensions that are large enough to form the respective second glass panels 30 of the glass panel units 10A-10G.

The peripheral wall 410 is made of a sealant (first sealant). The first sealant includes a hot glue, for example. The hot glue may be a glass frit, for example. The glass frit may be a low-melting glass frit, for example. Examples of the low-melting glass frits include a bismuth-based glass frit, a lead-based glass frit, and a vanadium-based glass frit. The first sealant further includes a core material. The core material is used to define the height of the frame member 40. The core material may be spherical glass beads, for example. The diameter of the glass beads may be selected according to the height of the frame member 40. Such a core material is dispersed at a predetermined ratio in the hot glue. For example, glass beads with a diameter of 50 µm to 300 µm are included to account for 0.01 wt % to 1 wt % (0.03% to 3% by volume) of the hot glue.

The peripheral wall 410 is located between the pair of glass substrates 200, 300. The peripheral wall 410 has a frame shape as shown in FIG. 1. In particular, the peripheral wall 410 may have a rectangular frame shape. The peripheral wall 410 is formed along the respective outer peripheries of the first and second glass substrates 200, 300. The peripheral wall 410 has first to fourth sides 410*a*-410*d*. The first and second sides 410*a*, 410*b* extend along the width of the first and second glass substrates 200, 300 (i.e., in the upward/downward direction in FIG. 3). The third and fourth sides 410*c*, 410*d* extend along the length of the first and second glass substrates 200, 300 in the rightward/leftward direction in FIG. 1). The peripheral wall 410 is provided to hermetically bond the first and second glass substrates 200, 300 together. Thus, in the assembly 100, an internal space 500 is formed to be surrounded with the peripheral wall 410, the first glass substrate 200, and the second glass substrate 300.

Each of the plurality of partitions 420*a*-420*p* is made of a sealant (second sealant). The second sealant includes a hot glue, for example. The hot glue may be a glass frit, for example. The glass frit may be a low-melting glass frit, for example. Examples of the low-melting glass frits include a bismuth-based glass frit, a lead-based glass frit, and a vanadium-based glass frit. In this embodiment, the hot glue of the partitions 420*a*-420*p* is the same as that of the peripheral wall 410. Therefore, the partitions 420*a*-420*p* and the peripheral wall 410 have the same softening point. In addition, the second sealant includes the same core material as the first sealant. In the second sealant, the core material is also dispersed at a predetermined ratio in the hot glue. For example, glass beads with a diameter of 50 µm to 300 µm are included to account for 0.01 wt % to 1 wt % (0.03% to 3% by volume) of the hot glue.

The partitions 420*a*-420*p* partition the internal space 500 surrounded with the pair of glass substrates 200, 300 and the peripheral wall 410 into first spaces 510*a*-510*g* and second spaces 520*a*, 520*b*. In the assembly 100, the first spaces 510*a*-510*g* are spaces to be evacuated later (evacuation spaces) and the second spaces 520*a*, 520*b* are spaces for use to evacuate the first spaces 510.

As shown in FIG. 1, the partitions 420*a*-420*p* are located within the area surrounded with the peripheral wall 410. Each of the partitions 420*a*-420*p* is lower in height than the peripheral wall 410. Thus, as shown in FIG. 2, the peripheral wall 410 comes into contact with both the first and second glass substrates 200, 300 earlier than the partitions 420*a*-420*p* do. In the example illustrated in FIG. 2, the partitions 420*a*-420*p* are provided on the second glass substrate 300, and therefore, are spaced apart from the first glass substrate 200. Thus, even if the gap between the pair of glass substrates 200, 300 is narrower in the central region than in the peripheral region thereof due to the warpage of at least one of the first and second glass substrates 200, 300, the partitions 420*a*-420*p* are less likely to come into contact with both of the pair of glass substrates 200, 300. This reduces the chances of the contact of the peripheral wall 410 with both of the pair of glass substrates 200, 300 being interfered with by the partitions 420*a*-420*p*, thus reducing the chances of causing insufficient bonding between the pair of glass substrates 200, 300. This contributes to increasing the production yield.

More specifically, the partitions 420*a*, 420*b*, 420*c* are elongate partitions extending along the width of the pair of glass substrates 200, 300, (i.e., the upward/downward direction in FIG. 1) and are arranged in line so as to be spaced apart from each other along the width. The partitions 420*a*, 420*b*, 420*c* are located beside a first end (i.e., the right end in FIG. 1) along the length of the pair of glass substrates 200, 300 (i.e., the rightward/leftward direction in FIG. 1) and are arranged to be spaced from the first side 410*a* of the peripheral wall 410.

The partitions 420*d*, 420*e*, 420*f* are elongate partitions extending along the width of the pair of glass substrates 200, 300, and are arranged in line to be spaced apart from each other along the width. The partitions 420*d*, 420*e*, 420*f* are located closer to a second end (i.e., the left end in FIG. 1) along the length of the pair of glass substrates 200, 300 than the partitions 420*a*, 420*b*, 420*c* are. In addition, the partitions 420*d*, 420*e*, 420*f* face the partitions 420*a*. 420*b*, 420*c*, respectively, along the length of the pair of glass substrates 200, 300.

The partitions 420*g*, 420*h* are elongate partitions extending along the width of the pair of glass substrates 200, 300, and are arranged so as to be spaced apart from each other along the length of the pair of glass substrates 200, 300. The partitions 420*g*, 420*h* are located closer to the second end (i.e., the left end in FIG. 1) along the length of the pair of glass substrates 200, 300 than the partition 420*e* is.

The partitions 420*i*, 420*j*, 420*k*, 420*l* are elongate partitions extending along the length of the pair of glass substrates 200, 300, and are arranged in line so as to be spaced apart from each other along the length. In particular, the partition 420*i* is located between a first end (i.e., the upper end in FIG. 1) of the partition 420*h* and the second side 410*b* of the peripheral wall 410. The partition 420*j* is located between respective first ends (i.e., the upper ends in FIG. 1) of the partitions 420*h*, 420*g*. The partition 420*k* has a first end (i.e., the right end in FIG. 1) located between the partitions 420*d*, 420*e*, and a second end (i.e., the left end in FIG. 1) facing the first end (i.e., the upper end in FIG. 1) of the partition 420g. The partition 420l has a first end (i.e., the right end in FIG. 1) located between the partitions 420a, 420b and a second end (i.e., the left end in FIG. 1) located between the partitions 420d, 420e.

The partitions 420m, 420n, 420o are elongate partitions extending along the length of the pair of glass substrates 200, 300, and are arranged in line to be spaced apart from each other along the length. In addition, the partitions 420m, 420n, 420o face the partitions 420i, 420j, 420k, respectively, along the width of the pair of glass substrates 200, 300. In particular, the partition 420m is located between a second end (i.e., the lower end in FIG. 1) of the partition 420h and the second side 410b of the peripheral wall 410. The partition 420n is located between respective second ends (i.e., the lower ends in FIG. 1) of the partitions 420h, 420g. The partition 420o has a first end (i.e., the right end in FIG. 1) facing an end, located closer to the fourth side 410d of the peripheral wall 410, of the partition 420e, and a second end (i.e., the left end in FIG. 1) facing the second end (i.e., the lower end in FIG. 1) of the partition 420g.

The partition 420p is an elongate partition extending along the length of the pair of glass substrates 200, 300. In particular, the partition 420p has a first end (i.e., the right end in FIG. 1) located between the partitions 420b, 420c and a second end (i.e., the left end in FIG. 1) located between the partitions 420e, 420f.

In the assembly 100, the first space 510a is a space surrounded with the second and third sides 410b, 410c of the peripheral wall 410 and the partitions 420d, 420i, 420j, 420k, 420h, 420g. The first space 510b is a space surrounded with the second side 410b of the peripheral wall 410 and the partitions 420h, 420i, 420m. The first space 510c is a space surrounded with the partitions 420g, 420h, 420j, 420n. The first space 510d is a space surrounded with the partitions 420e, 420g, 420k, 420o. The first space 510e is a space surrounded with the second and fourth sides 410b, 410d of the peripheral wall 410 and the partitions 420e, 420f, 420g, 420h, 420m, 420n, 420o, 420p. The first space 510f is a space surrounded with the third side 410c of the peripheral wall 410 and the partitions 420a, 420d, 420l. The first space 510g is a space surrounded with the partitions 420b, 420e, 420l, 420p. The second space 520a is a space surrounded with the first, third and fourth sides 410a, 410c. 410d of the peripheral wall 410 and the partitions 420a, 420b, 420c, 420l. 420p. The second space 520b is a space surrounded with the fourth side 410d of the peripheral wall 410 and the partitions 420c, 420f, 420p.

In this embodiment, the gas adsorbent 60 is arranged in each of the first spaces 510a-510g as shown in FIG. 1. On the other hand, the plurality of pillars 70 are placed over the entire internal space 500 (i.e., in each of the first spaces 510a-510g and the second spaces 520a, 520b) as shown in FIG. 1.

The plurality of air passages 600 is used to evacuate the first spaces (evacuation spaces) 510a-510g through the evacuation port 700. In other words, via the plurality of air passages 600, the first spaces 510a-510g are connected (either directly or indirectly) to the second space 520a, 520b. In this embodiment, the partitions 420a-420p are arranged out of contact with each other. The respective gaps left between the partitions 420a-420p constitute the air passages 600. The respective air passages 600 are closed by melting and deforming the partitions 420a-420p once. This allows not only at least the first spaces 510a-510g to be (hermetically) separated from each other but also the first spaces 510a-510g to be (hermetically) separated from the second spaces 520a, 520b (see FIG. 3).

The evacuation port 700 connects the second spaces 520a, 520b to the external environment. In particular, the evacuation port 700 is a port connecting the second space 520a to the external environment. The evacuation port 700 is used to evacuate the first spaces 510a-510g through the second spaces 520a. 520b and the air passages 600. Thus, the air passages 600, the second spaces 520a. 520b, and the evacuation port 700 together form an evacuation path for evacuating the first spaces 510a-510g. The evacuation port 700 is provided through the second glass substrate 300 to connect the second space 520a to the external environment. Specifically, the evacuation port 700 is provided at a corner of the second glass substrate 300.

In this embodiment, the second space 520a is a ventilation space connected directly to the evacuation port 700. The second space 520b is not directly connected to the evacuation port 700 but constitutes a coupling space that connects the first space 510e to the second space 520a. The plurality of air passages 600 includes a plurality of air passages (two first air passages 611, 612) connecting the first space (evacuation space) 510e to the second space (coupling space) 520b as shown in FIG. 1. The plurality of air passages 600 further includes a plurality of air passages (two second air passages 621, 622) connecting the second space (ventilation space) 520a to the second space (coupling space) 520b. The plurality of air passages 600 further includes a plurality of air passages 630 connecting the first spaces 510f, 510g to the second space 520a and a plurality of air passages 640 connecting the first spaces 510a-510g together.

More specifically, the first air passage 611 is an air passage between a first end (e.g., the upper end in FIG. 1) of the partition 420f and a second end (e.g., the left end in FIG. 1) of the partition 420p. The first air passage 612 is an air passage between a second end (e.g., the lower end in FIG. 1) of the partition 420f and the fourth side 410d of the peripheral wall 410. On the other hand, the second air passage 621 is an air passage between a first end (e.g., the upper end in FIG. 1) of the partition 420c and a first end (e.g., the right end in FIG. 1) of the partition 420p. The second air passage 622 is an air passage between a second end (e.g., the lower end in FIG. 1) of the partition 420c and the fourth side 410d of the peripheral wall 410. In this case, the second air passage 622 has a larger dimension than any of the first air passages 611, 612. That is to say, one or more second air passages 621, 622 include a particular air passage 622 having a larger dimension than one or more first air passages 611, 612. This allows the coupling space 520b to be used as a part of the evacuation path when the evacuation space 510e is evacuated via the evacuation port 700. This allows evacuation to be done efficiently. Among other things, this reduces the chances of, when the air passages 600 are closed by deforming the partitions 420a-420p in a second melting step (sealing step) to be described later, the second air passages 621, 622 being both closed before the first air passages 611, 612 are all closed. Thus, this reduces the chances of the evacuation space 510e being separated from the ventilation space 520a before the evacuation space 510e is evacuated sufficiently. This contributes to increasing the production yield.

1.3. Manufacturing Method

Next, a method for manufacturing the glass panel units 10 (10A-10G) using the assembly 100 will be described with reference to FIGS. 3-16. This method for manufacturing the glass panel units 10 includes preparatory steps and a removing step.

The preparatory steps are steps of providing the work in progress 110 of glass panel units (hereinafter simply referred to as the "work in progress 110") shown in FIGS. 3 and 4. The work in progress 110 is formed out of the glass panel unit assembly 100.

Figure 3:
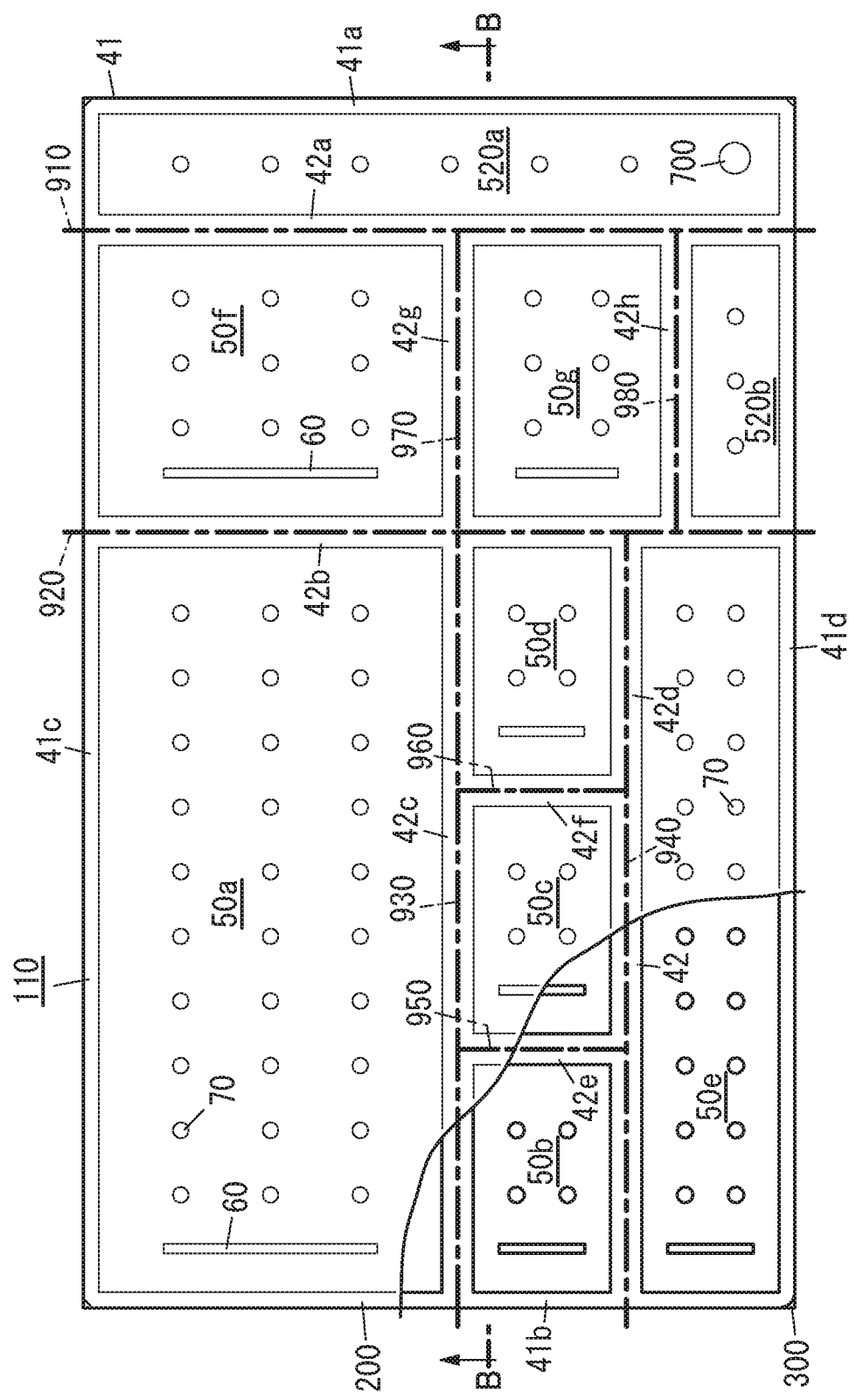
FIG. 3 is a plan view of a work in progress of glass panel units according to the exemplary embodiment.
Figure 4:
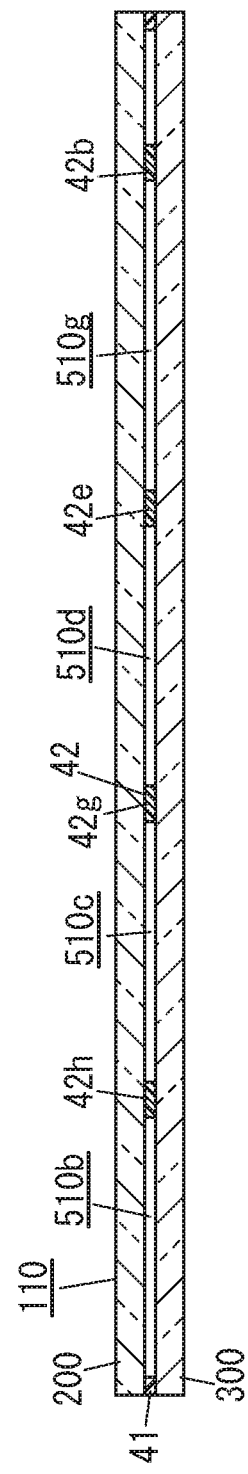
FIG. 4 is a cross-sectional view thereof taken along the plane B-B shown in FIG. 3.

The work in progress 110 includes: the pair of glass substrates (first and second glass substrates) 200, 300; a peripheral wall 41; and boundary walls 42a-42h as shown in FIGS. 3 and 4. In addition, the work in progress 110 further has vacuum spaces 50a-50g and second spaces 520a, 520b. Besides, the work in progress 110 further includes gas adsorbents 60 and a plurality of pillars (spacers) 70 in the respective vacuum spaces 50a-50h. The work in progress 110 further has an evacuation port 700.

The peripheral wall 41 is provided between the pair of glass substrates 200, 300 to hermetically bond the pair of glass substrates 200, 300 together. The peripheral wall 41 is formed by once melting, and then solidifying again, the peripheral wall 410 of the assembly 100. Just like the peripheral wall 410 of the assembly 100, the peripheral wall 41 of the work in progress 110 also has a frame shape. In particular, the peripheral wall 41 has first to fourth sides 41a, 41b, 41c, 41d. The first and second sides 41a, 41b extend along the width of the first and second glass substrates 200, 300 (i.e., in the upward/downward direction in FIG. 3). The third and fourth sides 41c, 41d extend along the length of the first and second glass substrates 200, 300 (i.e., the rightward/leftward direction in FIG. 3).

The boundary walls 42a-42h (spatially) separate the vacuum spaces 50a-50g and the second spaces 520a, 520b from each other. The boundary walls 42a-42h are formed out of the partitions 420a-420p. More specifically, the boundary wall 42a linearly extends along the width of the pair of glass substrates 200, 300 to couple together the third and fourth sides 41c, 41d of the peripheral wall 41.

The boundary wall 42a is formed by deforming the partitions 420a, 420b, 420c, 420l, 420p. The boundary wall 42b linearly extends along the width of the pair of glass substrates 200, 300 to couple together the third and fourth sides 41c, 41d of the peripheral wall 41. The boundary wall 42b is located between the boundary wall 42a and the second side 41b of the peripheral wall 41. The boundary wall 42b is formed by deforming the partitions 420d, 420e, 420f, 420k, 420l, 420p. The boundary wall 42c linearly extends along the length of the pair of glass substrates 200, 300 to couple together the second side 41b of the peripheral wall 41 and the boundary wall 42b. The boundary wall 42c is formed by deforming the partitions 420i, 420j, 420k, 420g, 420h. The boundary wall 42d linearly extends along the length of the pair of glass substrates 200, 300 to couple together the second side 41b of the peripheral wall 41 and the boundary wall 42b. The boundary wall 42d is located between the boundary wall 42c and the fourth side 41d of the peripheral wall 41. The boundary wall 42d is formed by deforming the partitions 420m, 420n. 420o. 420g, 420h. The boundary wall 42e, 42f linearly extend along the width of the pair of glass substrates 200, 300 to couple together the boundary walls 42c, 42d. The boundary walls 42e, 42f are formed by deforming the partitions 420h, 420g, respectively. The boundary wall 42g, 42h linearly extend along the length of the pair of glass substrates 200, 300 to couple together the boundary walls 42a, 42b. The boundary walls 42g, 42h are formed by deforming the partitions 420l, 420p, respectively.

The vacuum spaces 50a-50g are formed by evacuating the first spaces 510a-510g, respectively, through the second spaces 520a, 520b and the evacuation port 700. In other words, the vacuum spaces 50a-50g are the first spaces 510a-510g having a degree of vacuum equal to or less than a predetermined value. The predetermined value may be 0.1 Pa, for example. The vacuum spaces 50a-50g are perfectly sealed hermetically by the first glass substrate 200, the second glass substrate 300, the peripheral wall 41, and the boundary walls 42a-42h, and therefore, are separated from the second spaces 520a, 520b and the evacuation port 700.

In the work in progress 110, the vacuum space 50a (first space 510a) is a space surrounded with the second and third sides 41b, 41c of the peripheral wall 41 and the boundary walls 42b, 42c. The vacuum space 50b (first space 510b) is a space surrounded with the second side 41b of the peripheral wall 41 and the boundary walls 42c, 42d, 42e. The vacuum space 50c (first space 510c) is a space surrounded with the boundary walls 42c, 42d, 42e, 42f. The vacuum space 50d (first space 510d) is a space surrounded with the boundary walls 42b, 42c, 42d, 42f. The vacuum space 50e (first space 510e) is a space surrounded with the second and fourth sides 41b, 41d of the peripheral wall 41 and the boundary walls 42b, 42d. The vacuum space 50f (first space 510f) is a space surrounded with the third side 41c of the peripheral wall 41 and the boundary walls 42a, 42b, 42g. The vacuum space 50g (first space 510g) is a space surrounded with the boundary walls 42a, 42b, 42g, 42h.

As can be seen, the peripheral wall 41 and the boundary walls 42a-42h include, as their integral parts, a plurality of frame members 40 surrounding the vacuum spaces 50a-50g. That is to say, portions surrounding the respective vacuum spaces 50a-50g of the peripheral wall 41 and the boundary walls 42a-42h form the frame members 40.

The preparatory steps are steps of providing the work in progress 110 described above. The preparatory steps include an assembling step, a first melting step, an evacuation step, and a second melting step.

The assembling step is the step of providing the assembly 100. That is to say, the assembling step is the step of forming the first glass substrate 200, the second glass substrate 300, the peripheral wall 410, the partitions 420a-420p, the internal space 500, the air passages 600, the evacuation port 700, the plurality of gas adsorbents 60, and the plurality of pillars 70 to obtain the assembly 100. The assembling step includes first to sixth steps. Optionally, the order in which the second to fifth steps are performed may be changed as appropriate.

The first step is the step of forming the first glass substrate 200 and the second glass substrate 300 (i.e., a substrate forming step). For example, the first step includes making the first glass substrate 200 and the second glass substrate 300. If necessary, the first step may further include cleaning the first glass substrate 200 and the second glass substrate 300.

Figure 5:
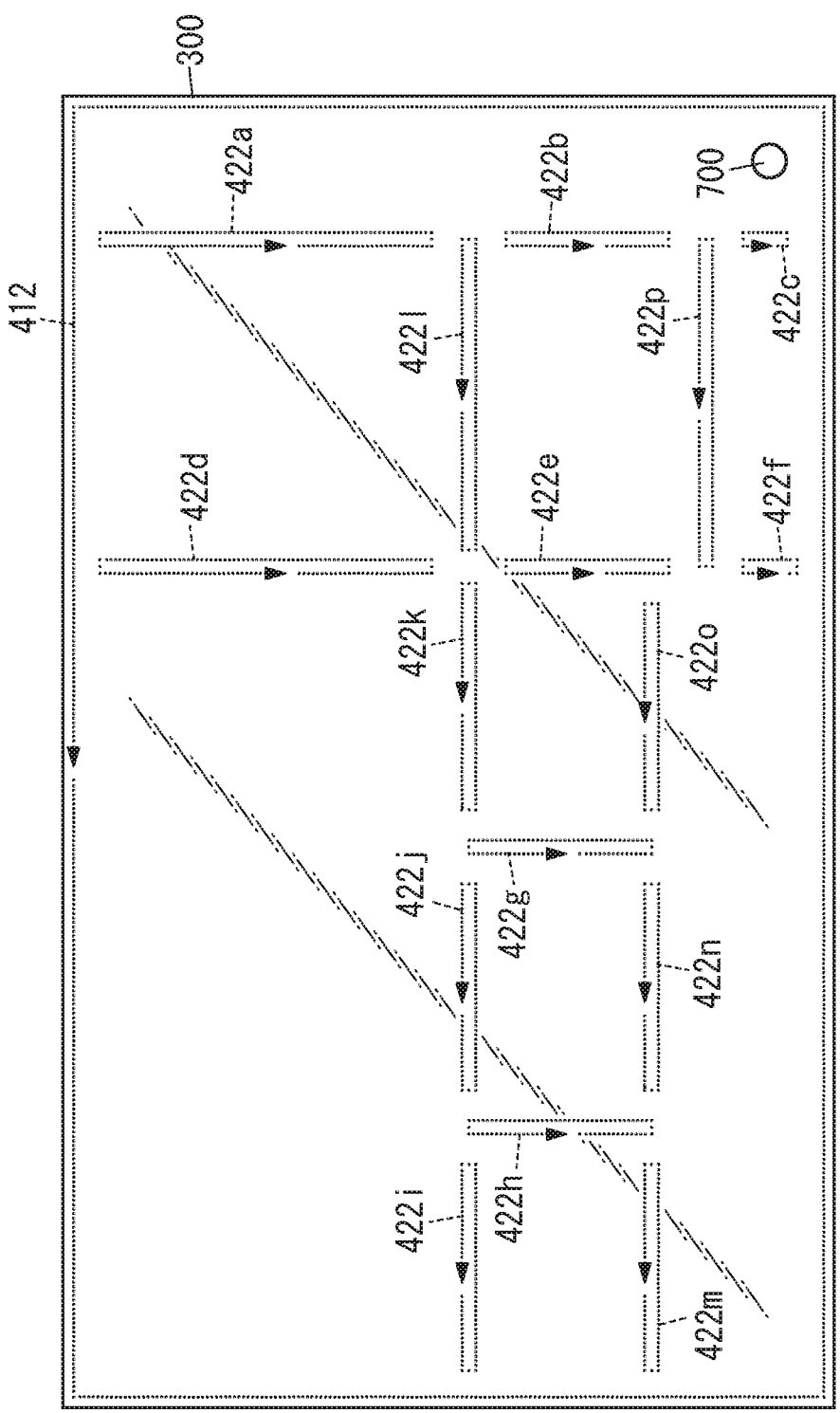
FIG. 5 illustrates how to perform a preparatory step (assembling step) in a method for manufacturing a glass panel unit according to the exemplary embodiment.

The second step is the step of forming the evacuation port 700. The second step includes providing the evacuation port 700 through the second glass substrate 300 as shown in FIG. 5. If necessary, the second step includes cleaning the second glass substrate 300.

The third step is the step of arranging the peripheral wall 410 and the partitions 420a-420p (sealant arrangement step). The third step includes a peripheral wall forming step and a partition forming step.

Figure 6:
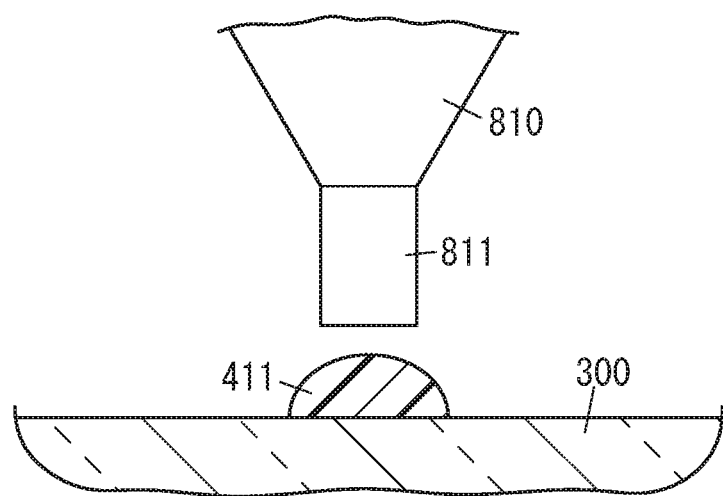
FIG. 6 illustrates how to perform the preparatory step (assembling step) in the manufacturing method.
Figure 7:
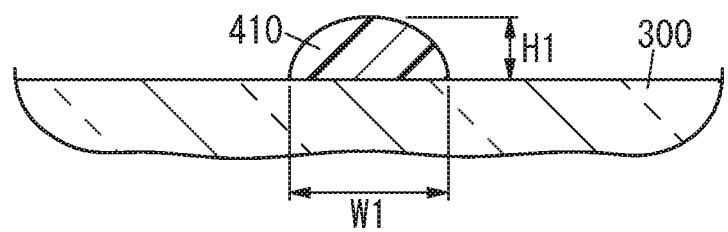
FIG. 7 illustrates how to perform the preparatory step (assembling step) in the manufacturing method.

The peripheral wall forming step is the step of forming the peripheral wall 410. More specifically, the peripheral wall forming step is the step of forming the peripheral wall 410 by applying a material for the peripheral wall 410 (first sealant) 411 through a dispenser 810 onto one of the pair of glass substrates 200, 300 (e.g., the second glass substrate 300 in this example) as shown in FIG. 6. In the peripheral wall forming step, when the material 411 for the peripheral wall 410 is applied onto the second glass substrate 300, the material 411 for the peripheral wall 410 discharged through a nozzle 811 of the dispenser 810 is not to be pressed by the nozzle 811 as shown in FIG. 6. Then, the dispenser 810 is moved along the peripheral edges of the second glass substrate 300 (e.g., as indicated by the arrow 412 shown in FIG. 5) with the material 411 discharged through the nozzle 811. Thereafter, the material 411 is allowed to dry to form the peripheral wall 410. In this manner, a peripheral wall 410, of which the first to fourth sides 410a-410d have a height H1 and a width W1, is obtained as shown in FIG. 7. The height of the peripheral wall 410 defines the dimension of the peripheral wall 410 in the direction in which the pair of glass substrates 200, 300 face each other. In this embodiment, the height of the peripheral wall 410 is the height H1 of the first to fourth sides 410a-410d. The height H1 and the width W1 may be adjusted according to the traveling velocity of the dispenser 810 and the rate of discharging the material 411, for example.

Figure 8:
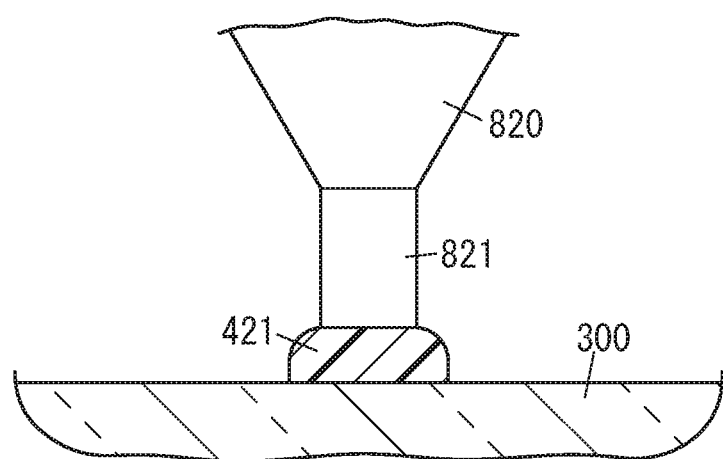
FIG. 8 illustrates how to perform the preparatory step (assembling step) in the manufacturing method.
Figure 9:
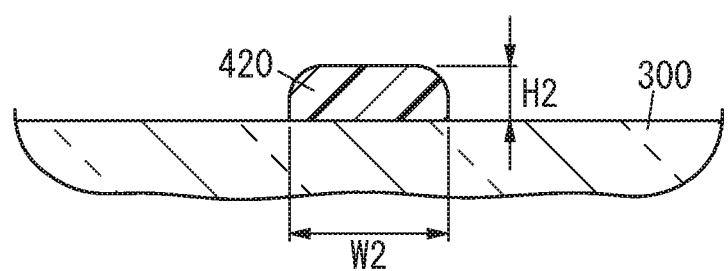
FIG. 9 illustrates how to perform the preparatory step (assembling step) in the manufacturing method.

The partition forming step is the step of forming the partitions 420a-420p. In the following description of the partition forming step, when there is no need to distinguish the partitions 420a-420p from each other, the partitions 420a-420p will be hereinafter collectively referred to "partitions 420." This partition forming step is the step of forming the partitions 420 by applying a material (second sealant) 421 for the partitions 420 through a dispenser 820 onto one of the pair of glass substrates 200, 300 (e.g., the second glass substrate 300) as shown in FIG. 8. In this partition forming step, when the material 421 for the partitions 420 is applied onto the second glass substrate 300, the material 421 for the partitions 420 discharged through a nozzle 821 of the dispenser 820 is pressed by the nozzle 821 as shown in FIG. 8. This is done to adjust the height of the partitions 420. This allows the partitions 420 obtained to have a height H2 which is smaller than the height H1 of the peripheral wall 410 as shown in FIG. 9. The height of the partitions 420 is the dimension of the partitions 420 in the direction in which the pair of glass substrates 200, 300 face each other. The width W2 of the partitions 420 may be adjusted according to the traveling velocity of the dispenser 820 and the discharge rate of the material 421, for example. However, the range in which the width W2 is adjustable by the traveling velocity of the dispenser 820. the discharge rate of the material 421, or any other parameter has a limit. Thus, in this embodiment, to make the width W2 of the partitions 420 greater than the width of the peripheral wall 410 (i.e., the width W1 of the first to fourth sides 410a-410d thereof), the materials 421 for the partitions 420 are applied adjacent to one another in a direction defining the width of the partitions 420 an increased number of times. That is to say, the number of times of applying the material 421 so that the materials 421 are adjacent to one another in the direction defining the width of the partitions 420 is greater than the number of times of applying the material 411 so that the materials 411 are adjacent to one another in the direction defining the width of the peripheral wall 410 (i.e., the width of the respective sides 410a-410d thereof). In other words, when the partitions 420 are formed, the number of application lines is increased compared to when the peripheral wall 410 is formed.

Figure 10:
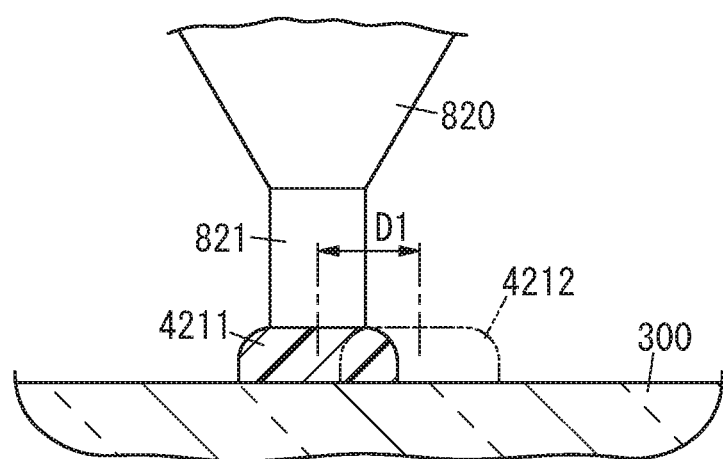
FIG. 10 illustrates how to perform the preparatory step (assembling step) in the manufacturing method.
Figure 11:
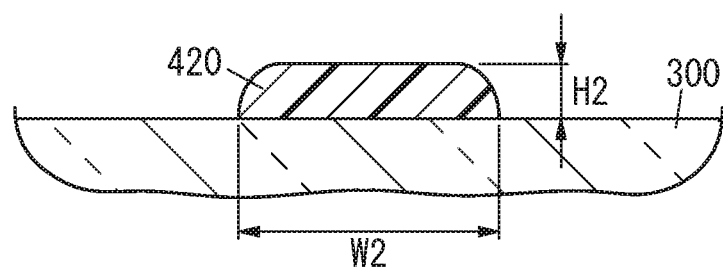
FIG. 11 illustrates how to perform the preparatory step (assembling step) in the manufacturing method.

In this embodiment, two application lines 4211, 4212 are formed by applying the material 421 for the partitions 420 twice in the direction defining the length of the partitions 420 so that the materials 421 are adjacent to one another in the direction defining the width of the partitions 420 as shown in FIG. 10. Specifically, the dispenser 820 is moved along the sides of quadrangles as indicated by the arrows 422a-422p shown in FIG. 5 with the material 421 discharged through the nozzle 821. Note that the arrows 422a-422p correspond to the partitions 420a-420p, respectively. In this case, the interval D1 between the two adjacent application lines 4211, 4212 is set such that the respective surfaces of the two adjacent application lines 4211, 4212 are connected together to be level with each other (i.e., located on the same plane). This eliminates a recess from between the respective surfaces of the adjacent application lines 4211, 4212. This allows a partition 420 with a flat surface to be obtained as shown in FIG. 11. As used herein, "applying the material adjacently" means forming application lines adjacent to each other. Optionally, the application lines 4211, 4212 may be adjacent to each other to partially overlap with each other as shown in FIG. 10.

Thereafter, the material 421 is allowed to dry, thereby forming the partitions 420. In this manner, partitions 420 (420a-420p) with the height H2 and the width W2 are obtained as shown in FIG. 11. As can be seen, in the partition forming step, the material 421 for the partitions 420 discharged through the nozzle 821 of the dispenser 820 is pressed with the nozzle 821 of the dispenser 820. This makes the partitions 420 lower in height than the peripheral wall 410. In addition, in the partition forming step, the number of times of applying the material 421 so that the materials 421 are adjacent to one another in the direction defining the width of the partitions 420 is larger than the number of times of applying the material 411 so that the materials 411 are adjacent to one another in the direction defining the width of the respective sides 410a-410d of the peripheral wall 410 as described above. This allows the partitions 420 to have a broader width than the peripheral wall 410.

The fourth step is the step of forming pillars 70 (pillar forming step). The fourth step includes forming a plurality of pillars 70 in advance and placing, using a chip mounter or any other tool, the plurality of pillars 70 at predetermined positions on the second glass substrate 300. In this embodiment, the pillars 70 are lower in height than the partitions 420a-420p. Alternatively, the plurality of pillars 70 may also be formed by a combination of photolithography and etching techniques. In that case, the plurality of pillars 70 may be made of a photocurable material, for example. Still alternatively, the plurality of pillars 70 may also be formed by a known thin film forming technique.

The fifth step is the step of forming the gas adsorbents 60 (gas adsorbent forming step). The fifth step includes forming the gas adsorbents 60 by applying, using a dispenser, for example, a solution in which a powder of a getter is dispersed onto predetermined positions on the second glass substrate 300 and drying the solution.

Figure 12:
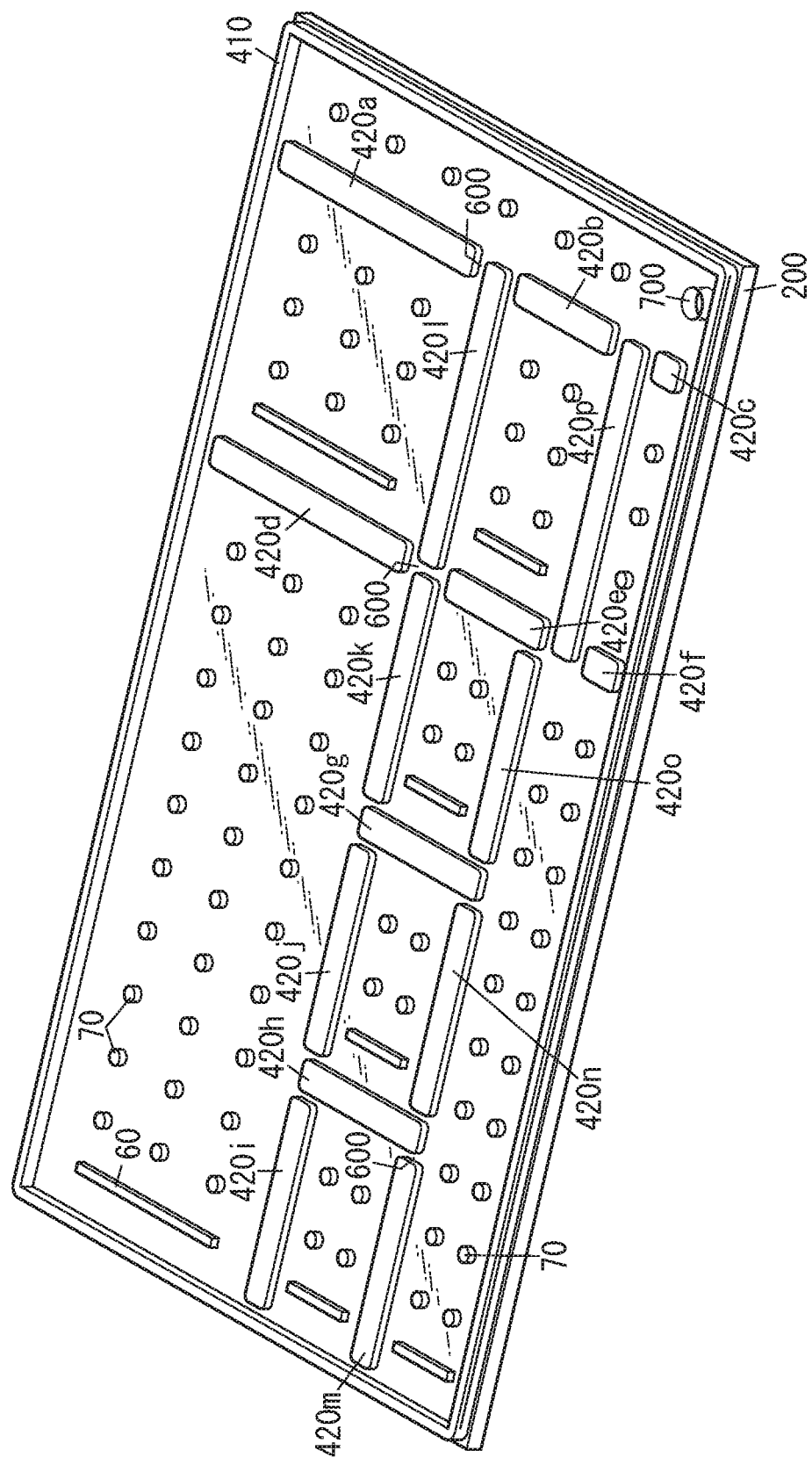
FIG. 12 illustrates how to perform the preparatory step (assembling step) in the manufacturing method.

By performing these first to fifth steps, the peripheral wall 410, the partitions 420a-420p, the air passages 600, the evacuation port 700, the plurality of gas adsorbents 60, and the plurality of pillars 70 are formed on the second glass substrate 300 as shown in FIG. 12.

The sixth step is the step of arranging the first glass substrate 200 and the second glass substrate 300 (arrangement step). In the sixth step, the first glass substrate 200 and the second glass substrate 300 are arranged to be parallel to each other and face each other as shown in FIG. 12.

The assembly 100 is obtained by performing this assembling step. After the assembling step has been performed, the first melting step (bonding step), the evacuation step, and the second melting step (sealing step) are carried out.

The first melting step is the step of melting the peripheral wall 410 once to hermetically bond the pair of glass substrates 200, 300 together with the peripheral wall 410. Specifically, the first glass substrate 200 and the second glass substrate 300 are loaded into a melting furnace and heated at a first melting temperature for a predetermined amount of time (first melting time). The first melting temperature and the first melting time are set such that the first glass substrate 200 and the second glass substrate 300 are hermetically bonded together with the peripheral wall 410 but that the air passages 600 are not closed with the partitions 420a-420p. That is to say, the lower limit of the first melting temperature is the softening point of the peripheral wall 410 but the upper limit of the first melting temperature is set such that the air passages 600 are not closed with the partitions 420a-420p. For example, if the softening point of the peripheral wall 410 and the partitions 420a-420p is 434° C. the first melting temperature is set at 440° C. The first melting time may be 10 minutes, for example. Also, in this first melting step, the peripheral wall 410 softens too much to support the first glass substrate 200 by itself anymore, and therefore, the first glass substrate 200 is supported by the partitions 420a-420p instead.

Figure 13:
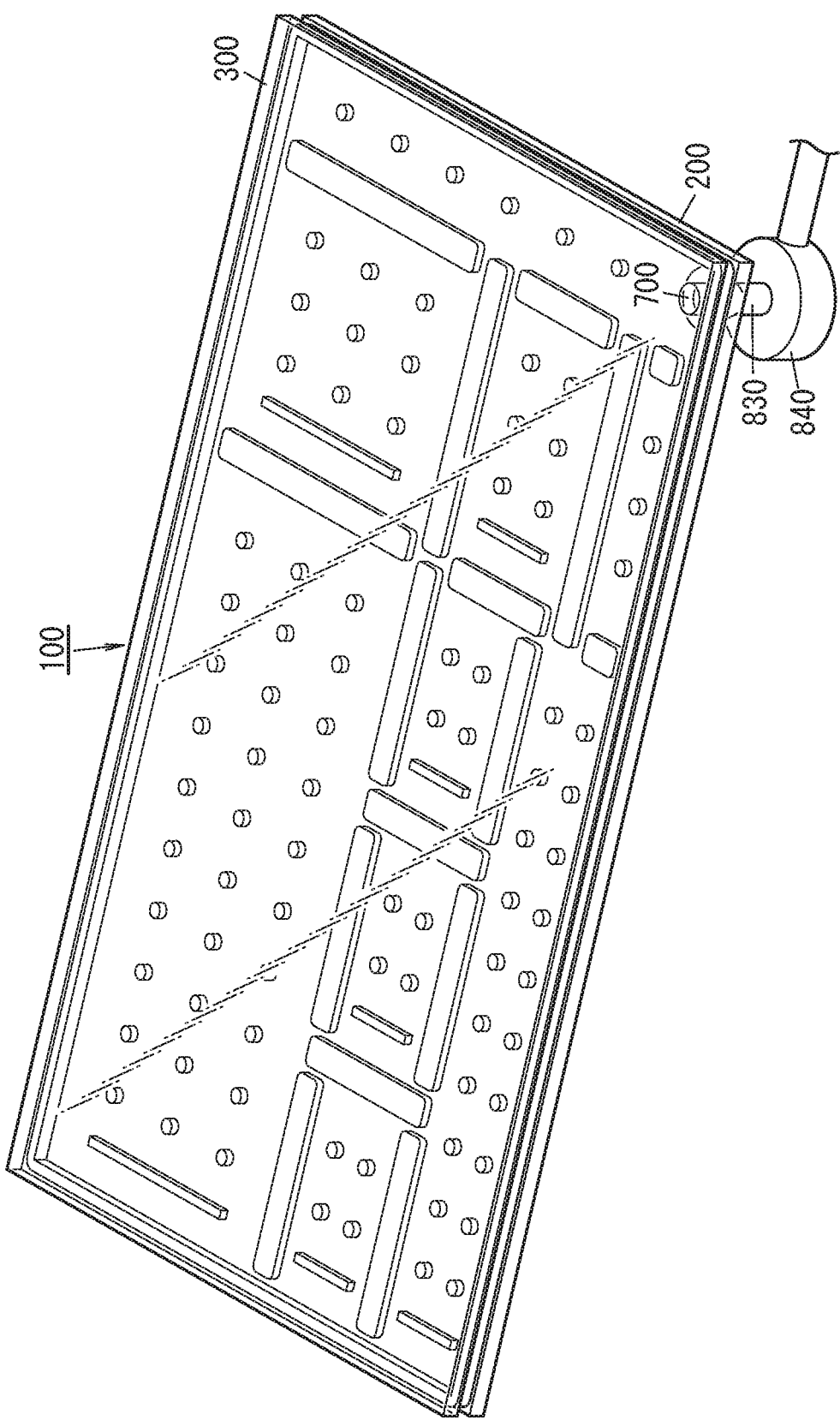
FIG. 13 illustrates how to perform the preparatory step (assembling step) in the manufacturing method.

The evacuation step is the step of evacuating the first spaces (evacuation spaces) 510a-510g through the air passages 600, the second spaces (ventilation space and coupling space) 520a, 520b, and the evacuation port 700 and thereby turning the first spaces 510a-510g into vacuum spaces 50 (50a-50g). In other words, the vacuum spaces 50a-50g are the first spaces 510a-510g in vacuum condition. The evacuation may be carried out using a vacuum pump, for example. The vacuum pump may be connected to the assembly 100 via an evacuation pipe 830 and a sealing head 840 as shown in FIG. 13. The evacuation pipe 830 may be bonded to the second glass substrate 300 such that the inside of the evacuation pipe 830 and the evacuation port 700 communicate with each other, for example. Then, the sealing head 840 is attached to the evacuation pipe 830, thereby connecting a suction port of the vacuum pump to the evacuation port 700. The first melting step, the evacuation step, and the second melting step are performed with the assembly 100 kept loaded in the melting furnace. Therefore, the evacuation pipe 830 is bonded to the second glass substrate 300 at least before the first melting step.

The evacuation step includes evacuating the first spaces 510a-510g at a temperature equal to or higher than an evacuation temperature for a predetermined amount of time (evacuation time) via the air passages 600, the second spaces 520a, 520b, and the evacuation port 700 before the second melting step is started. The evacuation temperature is set at a temperature higher than the activation temperature (e.g., 350° C.) of the getter of the gas adsorbents 60 but lower than the softening point (e.g., 434° C.) of the partitions 420a-420p. The evacuation temperature may be 390° C., for example. This prevents the partitions 420a-420p from being deformed. In addition, this causes the getter of the gas adsorbents 60 to be activated and also causes the molecules (gas) adsorbed onto the getter to be released from the getter. Then, the molecules (i.e., the gas) released from the getter are exhausted through the first spaces 510a-510g, the air passages 600, the second spaces 520a, 520b, and the evacuation port 700. Thus, this evacuation step allows the gas adsorbents 60 to recover their adsorption ability. The evacuation time is set to create vacuum spaces 50a-50g with a predetermined degree of vacuum (e.g., a degree of vacuum of 0.1 Pa or less). The evacuation time may be set at 120 minutes, for example.

The second melting step is the step of closing the air passages 600 by deforming the partitions 420a-420p to form the boundary walls 42a-42h and thereby obtain the work in progress 110. That is to say, the second melting step includes closing the air passages 600 to form a plurality of frame members 40 surrounding the vacuum spaces 50a-50g. As a result, as shown in FIGS. 3, 4, and 12, boundary walls 42a-42h are formed which hermetically separate the internal space 500 into the first spaces 510a-510g (vacuum spaces 50a-50g) and the second spaces 520a, 520b. In other words, the second melting step is the step of forming the boundary walls 42a-42h that hermetically separate the internal space 500 into the first spaces 510a-510g and the second spaces 520a, 520b by deforming the partitions 420a-420p to close the air passages 600. Note that in the second melting step, the partitions 420a-420p soften too much to support the first glass substrate 200 by themselves anymore, and therefore, the first glass substrate 200 is supported by the pillars 70 instead.

More specifically, melting the partitions 420a-420p once at a predetermined temperature (second melting temperature) equal to or higher than the softening point of the partitions 420a-420p causes the partitions 420a-420p to be deformed. Specifically, the first glass substrate 200 and the second glass substrate 300 are heated in the melting furnace at a second melting temperature for a predetermined amount of time (second melting time). The second melting temperature and the second melting time are set such that the partitions 420a-420p are softened to close the air passages 600. The lower limit of the second melting temperature is the softening point (e.g., 434° C.) of the partitions 420a-420p. The second melting temperature may be set at 460° C., for example. Also, the second melting time may be 30 minutes, for example.

In addition, in the second melting step, the internal space 500 continues to be evacuated. That is to say, the second melting step includes forming the boundary walls 42a-42h that close the air passages 600 by deforming the partitions 420a-420p at the second melting temperature while evacuating the first spaces 510a-510g via the air passages 600, the second spaces 520a, 520b, and the evacuation port 700. This further reduces the chances of the degree of vacuum in the vacuum spaces 50a-50g decreasing during the second melting step. Nevertheless, in the second melting step, the internal space 500 does not have to be evacuated continuously. Optionally, the second melting step may also be the step of closing all of the plurality of air passages 600 but at least the second air passages 621, 622 by deforming the partitions 420a-420p. That is to say, the second air passages 621, 622 do not have to be closed. Optionally, however, the second air passages 621, 622 may also be closed along with the other air passages 600.

Figure 14:
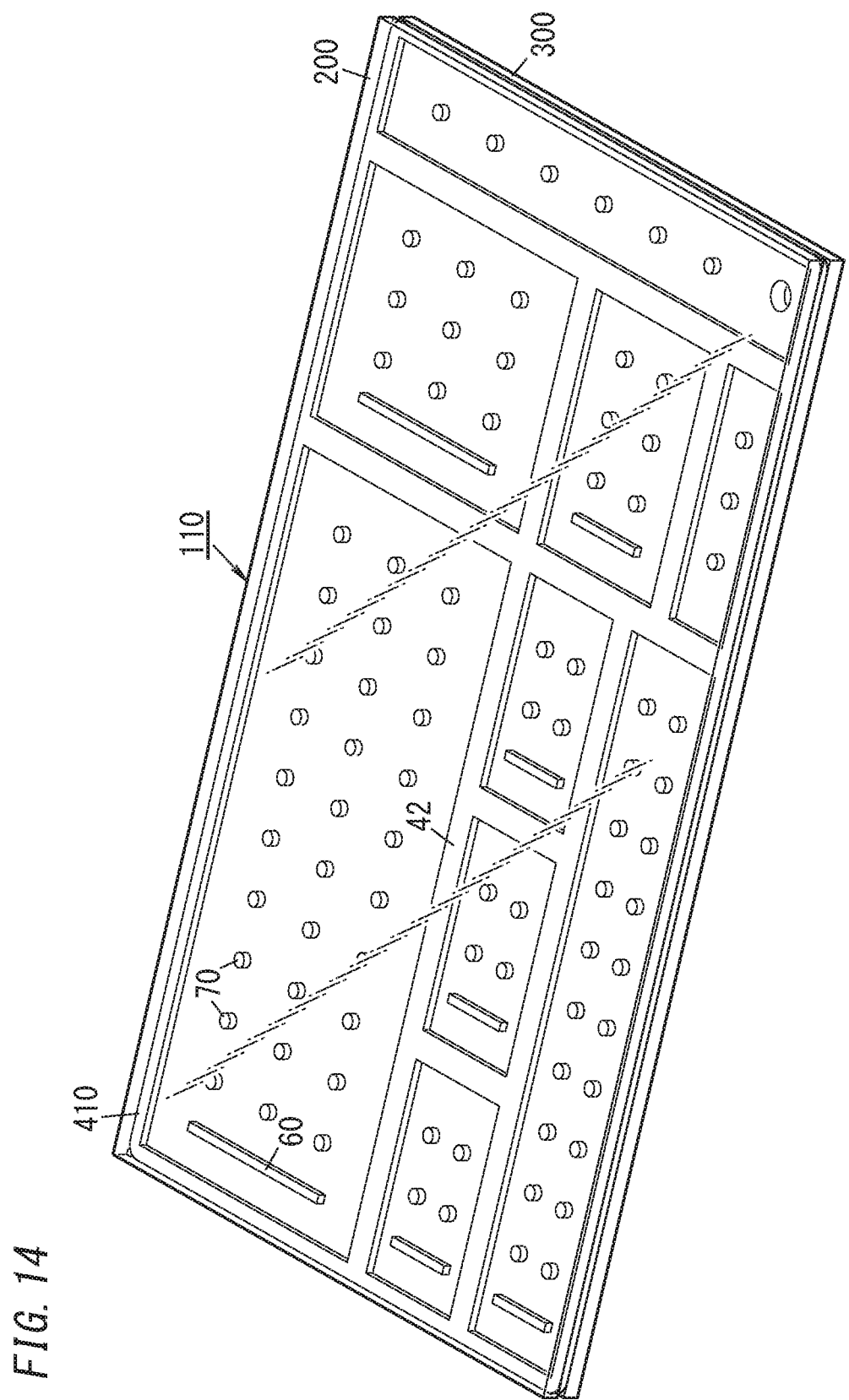
FIG. 14 illustrates how to perform the preparatory step (assembling step) in the manufacturing method.

By performing these preparatory steps, the work in progress 110 shown in FIGS. 3, 4, and 14 is obtained. In the work in progress 110, the peripheral wall 410 and the partitions 420a-420p are once melted through the first melting step and the second melting step. Thus, the gap between the pair of glass substrates 200, 300 is defined by the pillars 70, not the peripheral wall 410. That is to say, while being melted, the peripheral wall 410 is compressed between the first and second glass substrates 200, 300, thus forming a peripheral wall 41 which has a smaller height and a broader width than the peripheral wall 410. That is to say, the peripheral wall 41 is the peripheral wall 410 that has been deformed through the sealing step (second melting step). The respective sides 41a-41d of this peripheral wall 41 have a smaller height and a broader width than the respective sides 410a-410d of the peripheral wall 410. In the same way, the partitions 420a-420p being melted are also compressed between the first and second glass substrates 200, 300, thereby forming boundary walls 42a-42h. That is to say, the boundary walls 42 (42a-

42*h*) are partitions 420 (420*a*-420*p*) that have been deformed through the sealing step (second melting step). These boundary walls 42*a*-42*h* have a smaller height and a broader width than the partitions 420*a*-420*p*. In this embodiment, the height H1 and width W1 of the respective sides 410*a*-410*d* of the peripheral wall 410 and the height H2 and width W2 of the partitions 420*a*-420*p* are selected such that the width of the boundary walls 42*a*-42*h* is double the width of the respective sides 41*a*-41*d* of the peripheral wall 41. That is to say, the partitions 420*a*-420*p* are formed such that the boundary walls 42*a*-42*h* will have a broader width than the peripheral wall 410 that has gone through the sealing step (i.e., the peripheral wall 41). Although the partitions 420*a*-420*p* and the peripheral wall 410 have different heights, the same core material is dispersed in the first sealant and the second sealant. Thus, the peripheral wall 41 and the boundary walls 42*a*-42*h* to be formed out of the peripheral wall 410 and the partitions 420*a*-420*p*, respectively, will have the same height. This allows the frame members 40 to have a uniform height.

The removing step is performed after the preparatory steps have been performed. The removing step is the step of obtaining glass panel units 10A-10G out of the work in progress 110. The removing step is the step of obtaining glass panel units 10A-10G as parts including the first spaces (evacuation spaces) 510*a*-510*g*, respectively, by removing a part 11A including the second space (ventilation space) 520*a* and a part 11B including the second space (coupling space) 520*b*. That is to say, the removing step includes cutting off the work in progress 110 into the glass panel units 10A-10G. In the work in progress 110, the glass panel units 10A-10G form integral parts thereof. Thus, the glass panel units 10A-10G are separated from each other by cutting off the work in progress 110.

For example, as shown in FIG. 3, the work in progress 110 (in particular, the glass substrates 200, 300) is cut off along cutting lines 910, 920, 930, 940, 950, 960, 970, 980 aligned with the boundary walls 42*a*-42*h*, respectively. Note that the cutting lines 910, 920, 930, 940, 950, 960, 970, 980 pass through the respective centerlines of the boundary walls 42*a*-42*h*. That is to say, each of the boundary walls 42*a*-42*h* is divided into two along the width thereof. In this embodiment, the boundary walls 42*a*-42*h* are formed out of the partitions 420*a*-420*p*. The partitions 420*a*-420*p* have a broader width than the respective sides 410*a*-410*d* of the peripheral wall 410. Thus, the boundary walls 42*a*-42*h* also have a broader width than the respective sides 41*a*-41*d* of the peripheral wall 41. This facilitates the work of cutting off the work in progress 110 along the boundary walls 42*a*-42*h*. In particular, this reduces the chances of the boundary walls 42*a*-42*h* being damaged while being cut off to connect the first spaces 510*a*-510*g* to the external environment unintentionally and cause a decrease in the degree of vacuum. This contributes to increasing the production yield. In addition, the width of the boundary walls 42*a*-42*h* is double the width of the respective sides 41*a*-41*d* of the peripheral wall 41. Thus, even if the frame member 40 includes a part of the peripheral wall 41, the respective sides of the frame member 40 still have an equal width. This increases the strength of the frame member 40 as a whole.

Furthermore, in this embodiment, the plurality of spacers 70 are dispersed over the entire internal space 500 (i.e., in each of the first spaces 510*a*-510*g* and the second spaces 520*a*, 520*b*). This allows the stress applied to the pair of glass substrates 200, 300 while the work in progress 110 is being cut off to be distributed uniformly by the plurality of spacers, thus reducing the chances of the pair of glass substrates 200, 300 being damaged or causing cutting failures.

Figure 16:
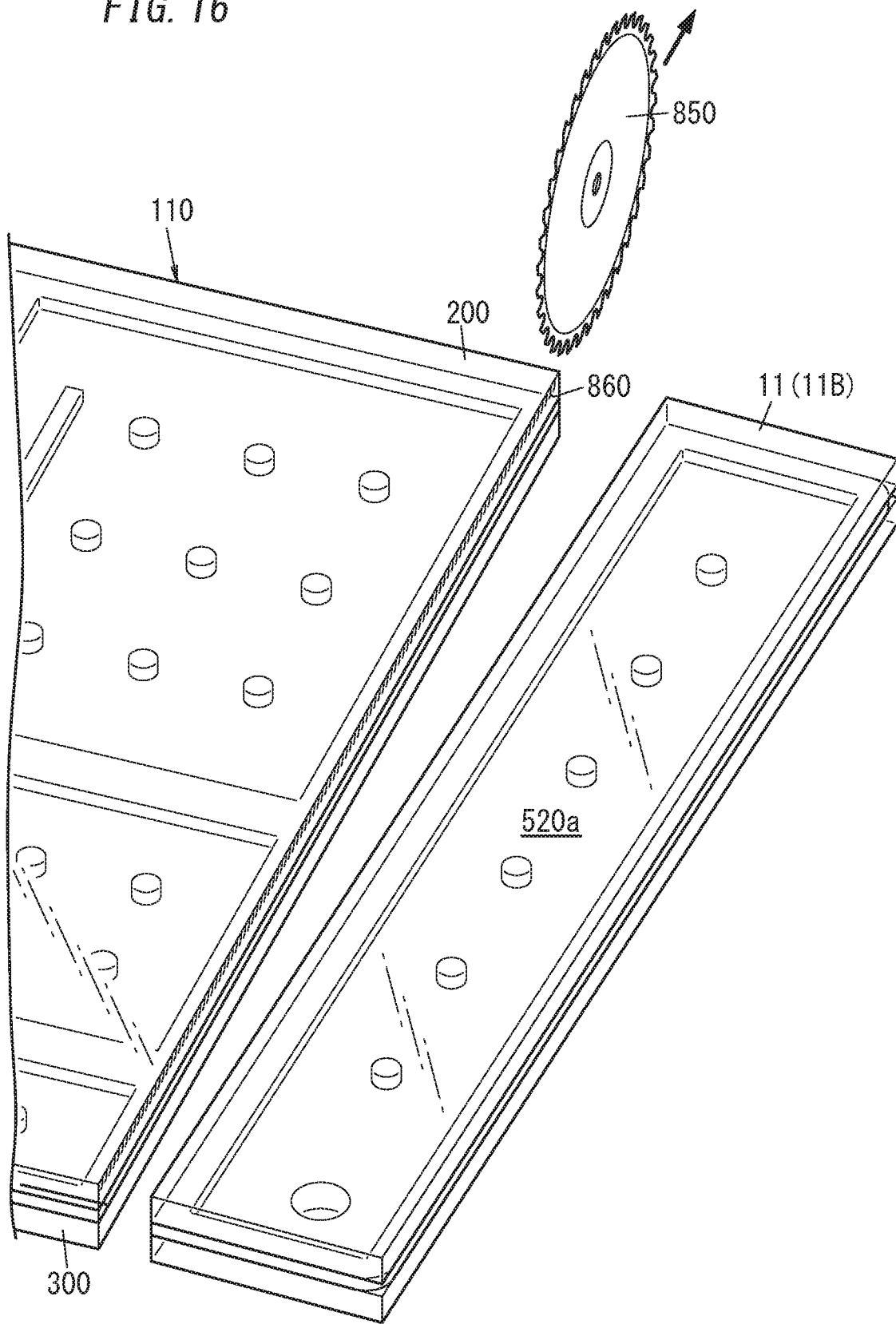
FIG. 16 illustrates how to perform the removing step in the manufacturing method.
Figure 17:
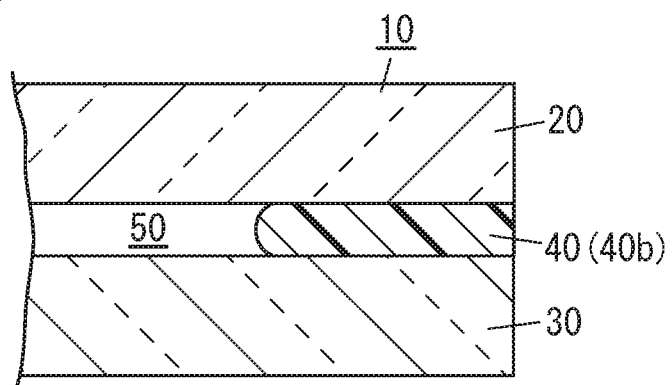
FIG. 17 is a partial cross-sectional view of a glass panel unit manufactured by the manufacturing method.
Figure 18:
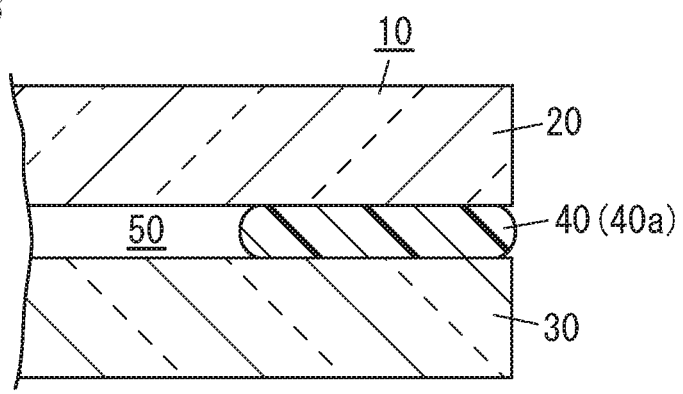
FIG. 18 is a partial cross-sectional view of a glass panel unit manufactured by the manufacturing method.
Figure 19:
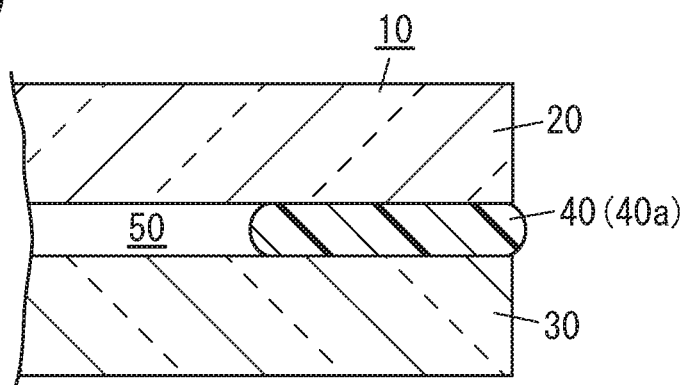
FIG. 19 is a partial cross-sectional view of a glass panel unit manufactured by the manufacturing method.

To cut off the work in progress 110, a cutter wheel 850 may be used as shown in FIG. 16. FIG. 16 illustrates an example in which the work in progress 110 is cut off along a cutting line 910. When the work in progress 110 is cut off with the cutter wheel 850, rib marks 860 are observed on the cut plane. In FIG. 16, the work in progress 110 is cut off from over the first glass substrate 200. Thus, the rib marks 860 on the cut plane of the work in progress 110 are left on a part, facing away from the second glass substrate 300, of the first glass substrate 200. Conversely, if the work in progress 110 is cut off from under the second glass substrate 300, then rib marks 860 on the cut plane of the work in progress 110 will be left on a part, facing away from the first glass substrate 200, of the second glass substrate 300. That is to say, it can be said that a given glass panel unit 10 has been separated from the work in progress 110 if at least one of the side surfaces of the glass panel unit 10 is the cut plane and the rib marks 860 are left on a part, facing away from the other glass panel 20, 30, of one glass panel 20, 30. In this case, it may be determined, by checking the shape of the outer side surfaces of the frame member 40, whether or not a side surface of the glass panel unit 10 is a cut plane. If the side surface of the glass panel unit 10 is a cut plane, then the outer side surface of the frame member 40 is a flat surface as shown in FIG. 17. In particular, this flat surface seems to be flush with the respective side surfaces of the pair of glass panels 20, 30. On the other hand, unless the side surface of the glass panel unit 10 is a cut plane, the outer side surface of the frame member 40 is highly likely a raised surface as shown in FIGS. 18 and 19. In that case, the outer side surface of the frame member 40 may be recessed inward with respect to the respective side surfaces of the pair of glass panels 20, 30 as shown in FIG. 18. Conversely, the outer side surface of the frame member 40 may also protrude out of the glass panel unit 10 with respect to the respective side surfaces of the pair of glass panels 20, 30 as shown in FIG. 19. Therefore, the glass panel unit 10 obtained by the manufacturing method described above includes a pair of glass panels 20, 30 arranged to face each other and a frame member 40 disposed between the pair of glass panels 20, 30 to hermetically bond the pair of glass panels 20, 30 together. The outer side surface of the frame member 40 is an at least partially flat surface. In particular, in the glass panel units 10A, 10B, 10E, 10G, the frame member 40 includes a first part 40*a* with the raised outer side surface (see FIGS. 18 and 19) and a second part 40*b* with a flat outer side surface (see FIG. 17). In this case, the first part 40*a* is a part corresponding to the peripheral wall 41. The second part 40*b* is a part corresponding to the boundary walls 42 (see FIG. 15). The first part 40*a* and the second part 40*b* may have an equal width. Nevertheless, the widths of the first part 40*a* and the second part 40*b* do not have to be exactly equal to each other but may be approximately equal to each other to the human eye.

By performing the removing step described above, glass panel units 10A-10G are obtained from the work in progress 110 as shown in FIG. 15. At this time, parts 11 (11A, 11B) including the second spaces 520*a*, 520*b* are obtained but are not used.

2. Variations

Note that the embodiment described above is only an example of the present disclosure and should not be construed as limiting. Rather, the embodiment may be readily modified in various manners depending on a design choice or any other factor without departing from the scope of the present disclosure. Next, variations of the embodiment described above will be enumerated one after another.

In the embodiment described above, the glass panel units 10 have a rectangular shape. However, this is only an example and should not be construed as limiting. Alternatively, the glass panel units 10 may also have a circular, polygonal, or any other desired shape. That is to say, the first glass panel 20, the second glass panel 30, and the frame member 40 do not have to be rectangular but may also have a circular, polygonal, or any other desired shape. In addition, the respective shapes of the first glass substrate 200, the second glass substrate 300, the peripheral wall 410, and the partitions 420 do not have to be the ones used in the embodiment described above, but may also be any other shapes that allow glass panel units 10 of a desired shape to be obtained. Note that the shape and dimensions of the glass panel units 10 may be determined according to the intended use of the glass panel units 10.

The pair of glass panels 20, 30 does not have to have the same planar shape and planar dimensions and does not have to have the same thickness, either. In addition, the pair of glass panels 20, 30 does not have to be made of the same material, either. The same statement applies to the pair of glass substrates 200, 30 as well.

The frame member 40 does not have to have the same planar shape as the pair of glass panels 20, 30. Likewise, the peripheral wall 41, 410 does not have to have the same planar shape as the pair of glass substrates 20, 300, either.

The first sealant of the peripheral wall 410 (peripheral wall 41) and the second sealant of the partitions 420*a*-420*p* (boundary walls 42*a*-42*h*) do not need to include the same core material but may include mutually different core materials. Furthermore, the first sealant may consist essentially of a hot glue. Likewise, the second sealant may also consist essentially of a hot glue.

The partitions 420*a*-420*p* do not have to have a broader width than the peripheral wall 410. Alternatively, the width of the partitions 420*a*-420*p* may be equal to or greater than, or equal to or less than, the width of the peripheral wall 410 (i.e., the width of the first to fourth sides 410*a*-410*d* thereof). In addition, the boundary walls 42*a*-42*h* do not have to have a broader width than the peripheral wall 41. Alternatively, the width of the boundary walls 42*a*-42*h* may be equal to or greater than, or equal to or less than, the width of the peripheral wall 41 (i.e., the width of the first to fourth sides 41*a*-41*d* thereof).

Also, in the assembly 100, the peripheral wall 410 is just provided between the pair of glass substrates 200, 300 and does not bond the pair of glass substrates 200, 300 together. Optionally, however, in the assembly 100 stage, the peripheral wall 410 may bond the pair of glass substrates 200, 300 together. In short, in the assembly 100, the peripheral wall 410 needs to be provided between the pair of glass substrates 200, 300 and does not have to bond the pair of glass substrates 200, 300 together.

In the embodiment described above, the one or more second air passages 621, 622 include a particular air passage 622 which is larger than any of the one or more first air passages 611, 612. Alternatively, the dimension of each of the one or more second air passages 621, 622 may be equal to or greater than, or equal to or less than, that of any of the one or more first air passages 611, 612. That is to say, the particular air passage 622 is not an essential constituent element. In addition, in the embodiment described above, the partition 420*p* separates the second spaces 520*a*, 520*b* from each other. However, the partition 420*p* does not have to separate the second spaces 520*a*, 520*b* from each other. In short, the coupling space is not an essential constituent element. Rather at least the evacuation spaces (first spaces 510*a*-510*g*) and the ventilation space (second space 520*a*) need to be provided.

Furthermore, in the embodiment described above, the air passages 600 are the gaps between the partitions 420*a*-420*p* and the gaps between the partitions 420*a*-420*p* and the peripheral wall 410. However, this is only an example and should not be construed as limiting. Alternatively, the air passages 600 may also be through holes provided through the partitions 420*a*-420*p*. Still alternatively, the air passages 600 may also be gaps left between the partitions 420*a*-420*p* and the first glass substrate 200.

Furthermore, in the embodiment described above, the internal space 500 is partitioned into the plurality of first spaces 510*a*-510*g* and the plurality of second spaces 520*a*, 520*b*. However, the internal space 500 may be partitioned by at least one partition into one or more first spaces and one or more second spaces.

In the embodiment described above, a melting furnace is used to heat the peripheral wall 410, the gas adsorbents 60, and the partitions 420*a*-420*p*. However, heating may be conducted by any appropriate heating means. The heating means may be a laser beam, or a heat exchanger plate connected to a heat source, for example.

In the embodiment described above, the assembly 100 includes a plurality of air passages 600. However, the number of the air passages 600 provided may be one or more. The shape of the air passages 600 is not particularly limited.

In the embodiment described above, the evacuation port 700 is provided through the second glass substrate 300. However, this is only an example and should not be construed as limiting. Alternatively, the evacuation port 700 may be provided through the first glass substrate 200 or may also be provided through the peripheral wall 410 (peripheral wall 41). In short, the evacuation port 700 just needs to be provided to connect the second space 520*a*, 520*b* to the external environment.

Furthermore, the getter of the gas adsorbents 60 is an evaporative getter in the embodiment described above. Alternatively, the getter may also be a non-evaporative getter.

In the embodiment described above, the gas adsorbents 60 have an elongate flat plate shape. However, the gas adsorbents 60 may also have any other shape. In addition, the gas adsorbents 60 do not have to be located at an end of the vacuum space 50. Furthermore, in the embodiment described above, the gas adsorbents 60 are formed by applying a liquid including a powder of a getter (such as a dispersion liquid obtained by dispersing the powder of the getter in a liquid or a solution obtained by dissolving the powder of the getter in a liquid). However, this is only an example and should not be construed as limiting. Alternatively, the gas adsorbents 60 may include a substrate and a getter adhered to the substrate. Such gas adsorbents 60 may be obtained by immersing the substrate in a liquid including a powder of the getter and drying the substrate. Note that the substrate may have any desired shape and may have an elongate rectangular shape, for example. Still alternatively, the gas adsorbents 60 may also be a film formed to cover the surface of the second glass substrate 300 either entirely or only partially. Such gas adsorbents 60 may be obtained by coating the surface of the second glass substrate 300 with a liquid including a powder of the getter. Yet alternatively, the gas adsorbents 60 may be included in the pillars 70. The pillars 70 including the gas adsorbents 60 may be obtained by making the pillars 70 of a material containing the getter. Alternatively, the gas adsorbents 60 may even be a solid matter made of the getter.

Furthermore, in the embodiment described above, the plurality of spacers 70 are arranged over the entire internal space 500 (i.e., in each of the first spaces 510a-510g and the second spaces 520a, 520b). However, the pillars 70 do not have to be arranged in the second spaces 520a, 520b. Furthermore, in the embodiment described above, each glass panel unit 10 includes a plurality of pillars 70. Alternatively, each glass panel unit 10 may include a single pillar 70. Still alternatively, the glass panel unit 10 may include no pillars 70 at all.

In the embodiment described above, the first spaces (510a-510g) are vacuum spaces (50a-50g). However, the vacuum spaces (50a-50g) may be replaced with pressure reduced spaces. As used herein, the "pressure reduced spaces" refer to the first spaces (510a-510g) with a reduced pressure. The pressure reduced condition may be a condition in which the pressure is lower than the atmospheric pressure.

3. Aspects

As can be seen from the foregoing description of the exemplary embodiment and its variations, the present disclosure has the following aspects. In the following description, reference signs are added in parentheses to the respective constituent elements solely for the purpose of clarifying the correspondence between those aspects of the present disclosure and the exemplary embodiment described above.

A glass panel unit assembly (100) according to a first aspect includes: a pair of glass substrates (200, 300) arranged to face each other; a peripheral wall (410); a partition (420a-420p); an air passage (600); and an evacuation port (700). The peripheral wall (410) is disposed between the pair of glass substrates (200, 300) and has a frame shape. The partition (420a-420p) partitions an internal space (500), surrounded with the pair of glass substrates (200, 300) and the peripheral wall (410), into a first space (510a-510g) and a second space (520a, 520b). The air passage (600) connects the first space (510a-510g) and the second space (520a. 520b) together. The evacuation port (700) connects the second space (520a, 520b) to an external environment. The partition (420a-420p) is lower in height than the peripheral wall (410). The first aspect contributes to increasing the production yield.

A glass panel unit assembly (100) according to a second aspect may be implemented in combination with the first aspect. In the second aspect, the glass panel unit assembly (100) further includes one or more pillars (70) arranged in the internal space (500) to maintain a predetermined gap between the pair of glass substrates (200, 300). The one or more pillars (70) are lower in height than the partition (420a-420p). The second aspect contributes to increasing the production yield.

A glass panel unit assembly (100) according to a third aspect may be implemented in combination with the first or second aspect. In the third aspect, the partition (420a-420p) has a broader width than the peripheral wall (410). The third aspect contributes to increasing the production yield.

A glass panel unit assembly (100) according to a fourth aspect may be implemented in combination with any one of the first to third aspects. In the fourth aspect, the partition (420a-420p) and the peripheral wall (410) have the same softening point. The fourth aspect contributes to increasing the production yield.

A glass panel unit assembly (100) according to a fifth aspect may be implemented in combination with the fourth aspect. In the fifth aspect, a material for the partition (420a-420p) and a material for the peripheral wall (410) are the same. The fifth aspect contributes to increasing the production yield.

A glass panel unit assembly (100) according to a sixth aspect may be implemented in combination with any one of the first to fifth aspects. In the sixth aspect, the same core material is dispersed in the material for the partition (420a-420p) and the material for the peripheral wall (410). The sixth aspect contributes to increasing the production yield.

A method for manufacturing a glass panel unit according to a seventh aspect includes an assembling step, an evacuation step, and a sealing step. The assembling step includes providing the glass panel unit assembly (100) according to any one of the first to sixth aspects. The evacuation step includes evacuating the first space (510a-510g) through the air passage (600), the second space (520a, 520b), and the evacuation port (700). The sealing step includes deforming the partition (420a-420p) to close the air passage (600). The seventh aspect contributes to increasing the production yield.

A method for manufacturing a glass panel unit according to an eighth aspect may be implemented in combination with the seventh aspect. In the eighth aspect, the assembling step includes a partition forming step of forming the partition (420a-420p) by applying a material for the partition (420a-420p) onto one of the pair of glass substrates (200, 300) using a dispenser. The partition forming step includes making the partition (420a-420p) lower in height than the peripheral wall (410) by applying, with a nozzle (821) of the dispenser (820), pressing force to the material for the partition (420a-420p) that has been discharged through the nozzle (821). The eighth aspect facilitates adjustment of the height of the partition.

A method for manufacturing a glass panel unit according to a ninth aspect may be implemented in combination with the seventh or eighth aspect. In the ninth aspect, the assembling step includes a peripheral wall forming step of forming the peripheral wall (410) by applying a material for the peripheral wall (410) onto one of the pair of glass substrates (200, 300) using a dispenser (820). The peripheral wall forming step includes applying, with a nozzle of the dispenser, no pressing force to the material for the peripheral wall (410) that has been discharged through the nozzle. The ninth aspect contributes to increasing the production yield.

A method for manufacturing a glass panel unit according to a tenth aspect may be implemented in combination with any one of the seventh to ninth aspects. In the tenth aspect, the method further includes a removing step. The removing step includes removing a part (11A, 11B) including the second space (520a, 520b) to obtain a glass panel unit (10A-10G) as a part including the first space (510a-510g). The tenth aspect contributes to increasing the production yield.

REFERENCE SIGNS LIST

100 Glass Panel Unit Assembly
200, 300 Glass Substrate
410 Peripheral Wall
420a-420p Partition
421 Material 500 Internal Space
510a-510g First Space
520a, 520b Second Space
600 Air Passage
700 Evacuation Port
820 Dispenser
821 Nozzle
70 Pillar
10, 10A-10G Glass Panel Unit
11A, 11B Part

The invention claimed is:

1. A method for manufacturing a glass panel unit, the method comprising an assembling step, a first melting step, an evacuation step, and a sealing step, the assembling step including providing a glass panel unit assembly, having a pair of glass substrates arranged to face each other; a peripheral wall having a frame shape and disposed between the pair of glass substrates; a partition provided to partition an internal space, surrounded with the pair of glass substrates and the peripheral wall, into a first space and a second space, the partition being lower in height than the peripheral wall; an air passage being formed by a gap between the partition and another partition or a gap between the partition and the peripheral wall, connecting the first space and the second space together; and an evacuation port connecting the second space to an external environment, the first melting step including melting the peripheral wall to hermetically bond the pair of glass substrates, the evacuation step including evacuating the first space through the air passage, the second space, and the evacuation port, the sealing step including deforming the partition to close the air passage, and in the first melting step, the partition comes into contact with the pair of glass substrates after the peripheral wall comes into contact with the pair of glass substrates.

2. The method of claim 1, wherein the assembling step includes a partition forming step of forming the partition by applying a material for the partition onto one of the pair of glass substrates using a dispenser, the partition forming step including making the partition lower in height than the peripheral wall by applying, with a nozzle of the dispenser, pressing force to the material for the partition that has been discharged through the nozzle.

3. The method of claim 1, wherein the assembling step includes a peripheral wall forming step of forming the peripheral wall by applying a material for the peripheral wall onto one of the pair of glass substrates using a dispenser, the peripheral wall forming step including applying, with a nozzle of the dispenser, no pressing force to the material for the peripheral wall that has been discharged through the nozzle.

4. The method of claim 1, further comprising a removing step, wherein the removing step includes removing a part including the second space to obtain a glass panel unit as a part including the first space.

\* \* \* \* \*